United States Patent
Hashimoto

[19]

[11] Patent Number: 5,971,466
[45] Date of Patent: *Oct. 26, 1999

[54] REAR SEAT APPARATUS FOR A VEHICLE

[75] Inventor: Kazunori Hashimoto, Aichi-ken, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/715,615

[22] Filed: Sep. 18, 1996

[30] Foreign Application Priority Data

Sep. 22, 1995 [JP] Japan .................................... 7-244874
Feb. 14, 1996 [JP] Japan .................................... 8-026747

[51] Int. Cl.$^6$ ...................................................... B60N 2/10
[52] U.S. Cl. .................................. 296/65.02; 296/65.05; 297/452.56
[58] Field of Search .............................. 296/65.05, 65.02, 296/65.13, 65.01; 297/452.55, 452.56, 452.54, 452.15

[56] References Cited

U.S. PATENT DOCUMENTS

| | | | |
|---|---|---|---|
| 3,208,085 | 9/1965 | Grimshaw | 297/452.55 X |
| 3,695,706 | 10/1972 | Basher et al. | 297/452.56 |
| 4,191,417 | 3/1980 | Ferrara | 296/65.01 |
| 4,475,763 | 10/1984 | Hamatani et al. | |
| 4,512,609 | 4/1985 | Parsson | |
| 4,637,653 | 1/1987 | Yoshida et al. | 296/65.01 X |
| 4,761,035 | 8/1988 | Urai | 297/452.56 |
| 5,044,683 | 9/1991 | Parsson | |
| 5,240,302 | 8/1993 | Yoshida et al. | |
| 5,681,077 | 10/1997 | Hashimoto | 296/65.01 X |

FOREIGN PATENT DOCUMENTS

| | | | |
|---|---|---|---|
| 022 691 | 1/1981 | European Pat. Off. | |
| 037 773 | 10/1981 | European Pat. Off. | |
| 2470-564 | 6/1981 | France | 297/452.54 |
| 29 35 628 | 2/1981 | Germany | |
| 4320382-A1 | 12/1994 | Germany | 297/452.55 |
| 3-125625 | 12/1991 | Japan | |
| 07025279 | 1/1995 | Japan | |
| 816-813 | 3/1979 | U.S.S.R. | 297/452.55 |

*Primary Examiner*—D. Glenn Dayoan
*Assistant Examiner*—Jason Morrow
*Attorney, Agent, or Firm*—Pillsbury Madison & Sutro LLP

[57] ABSTRACT

A rear seat apparatus for a vehicle which is provided on a floor surface where a recess is formed includes: a lower seat cushion portion located in the recess; and an upper seat cushion portion having a seating surface, wherein the lower seat cushion portion and the upper seat cushion portion are provided in such a manner as to be separable.

22 Claims, 19 Drawing Sheets

REAR SEAT APPARATUS FOR A VEHICLE

BACKGROUND OF THE INVENTION

1. Field of the Invention

The present invention relates to a rear seat apparatus for a vehicle, and more particularly to a rear seat apparatus for a vehicle which is disposed on a floor surface on the rear side of the vehicle.

2. Description of the Related Art

Conventionally, a structure shown in Japanese Utility Model Application Laid-Open (JP-U) No. 3-125625 is known as an example of a rear seat apparatus for a vehicle which is disposed on a rear-side floor surface of the vehicle.

As shown in FIG. 19, the rear seat apparatus for a vehicle has a cam hole 72 and a peripheral cam 74 which are formed in each of a pair of brackets 70, as well as a pivot shaft 78 and a guide shaft 80 which are provided on a seat cushion 76. With respect to a floor surface 82, the rear seat apparatus permits the seat cushion 76 to be moved from a first position (the position shown in FIG. 19) in which the seat cushion 76 is held substantially horizontally, to a second position (the position shown in FIG. 20) in which the seat cushion 76 is made upright substantially vertically, and to a third position (not shown) in which the seat cushion 76 is turned over in the forward direction of the vehicle.

With this rear seat apparatus for a vehicle, however, as shown in FIG. 19, the seat cushion 76 is disposed on the floor surface 82 which is flat. Therefore, to improve the cushioning feature of the seat cushion 76, it is conceivable to make the seat cushion 76 thick, but if the seat cushion 76 is made thick, the weight of the overall seat cushion 76 becomes heavy, with the result that the operating efficiency when the seat cushion 76 is moved to each position deteriorates. In the case where the seat cushion 76 is made thick, in order to prevent the submarine phenomenon (i.e., the phenomenon in which the waist belt of the seat belt fitted to a vehicle occupant becomes dislocated from his or her pelvis portion) during a frontal collision, it is necessary to separately provide a submarine-phenomenon preventing member, resulting in a further increase in the weight.

SUMMARY OF THE INVENTION

In view of the above-described circumstances, it is an object of the present invention to provide a rear seat apparatus for a vehicle which makes it possible to improve the cushioning feature of the seat cushion without a substantial increase in the weight.

In accordance with a first aspect of the present invention, there is provided a rear seat apparatus for a vehicle which is provided on a floor surface where a recess is formed, comprising: a lower seat cushion portion located in the recess; and an upper seat cushion portion having a seating surface, wherein the lower seat cushion portion and the upper seat cushion portion are provided in such a manner as to be separable.

Accordingly, when a vehicle occupant is seated, the upper and lower seat cushion portions undergo compressive deformation and sag, and the vehicle occupant is supported by the upper and lower seat cushion portions. Further, the buttocks of the vehicle occupant are supported by a recess formed in the floor surface. Additionally, the seat characteristics can be adjusted by modifying the rear seat cushion divisional portion together with the recess formed in the floor surface. Moreover, the rear seat apparatus for a vehicle offers an outstanding advantage that the cushioning feature of the seat cushion can be improved without a substantial increase in the weight. Moreover, the submarine phenomenon can be prevented, and by modifying the rear seat cushion divisional portion together with the recess formed in the floor surface, the rear seat cushion main body portions which are design components can be used in common for vehicle models belonging to the same vehicle type.

In accordance with a second aspect of the present invention, there is provided a rear seat apparatus for a vehicle in which at least a seat cushion of a rear seat disposed on a vehicle rear side floor surface portion which is one step higher than a floor surface having a step is provided in such a manner as to be capable of being swung up approximately 90 degrees in a forward direction of the vehicle, the seat cushion being disposed on the rear side floor surface in which a recess is formed, the rear seat apparatus for a vehicle comprising: a lower seat cushion portion which is disposed below the floor surface when the seat cushion is divided along the floor surface; and an upper seat cushion portion which is disposed above the floor surface when the seat cushion is divided along the floor surface, wherein only the upper seat cushion portion can be sprung up in the forward direction of the vehicle.

Accordingly, since the seat cushion is divided into two, upper and lower portions at a general floor surface, and there are no projecting portions on the rear surface of the upper seat cushion portion of the rear seat, the cushioning feature of the seat cushion improves, and the floor of the baggage compartment becomes flat. Since only the upper seat cushion portion moves, the operation of such as swinging up is facilitated.

In accordance with a third aspect of the present invention, in the first and second aspects of the present invention, the lower seat cushion portion is a bag with a fluid sealed therein.

Accordingly, since the weight of the vehicle occupant is dispersed to a wide range when the vehicle occupant is seated, it is possible to prevent only a central seating portion from being subjected to a strong reaction force from the floor. Additionally, even in cases where the shape of the floor is different, if the total capacity of the rear seat cushion divisional portion is similar, the rear seat cushion divisional portion can be used in common by virtue of the deformation of the bag.

In accordance with a fourth aspect of the present invention, the rear seat apparatus for a vehicle according to the first and second aspects of the present invention further comprises: a seat back having a board on a rear surface thereof, the board being mounted on the lower seat cushion portion as the seat back is laid down forward when the upper seat cushion is swung upward.

Accordingly, since the board is provided which is mounted on the lower seat cushion portion as the seat back is laid down forward, the rear seat cushion divisional portion which forms a part of the floor surface for the baggage compartment when the rear seat is laid down forward does not sag by being subjected to compressive deformation, so that deterioration of the baggage loading feature does not result.

In accordance with a fifth aspect of the present invention, in the first and second aspects of the present invention, the upper seat cushion has a webbing extending in a transverse direction of the vehicle, the webbing being stretched between portions of a frame embedded in a peripheral portion of the upper seat cushion portion, and a resilient member is disposed between each of the portions of the frame and the webbing.

Accordingly, in an upright state in which the upper seat cushion portion is swung up approximately 90 degrees, in the event that an impact is applied to the vehicle from the front side of the vehicle and the baggage moves forward, the baggage can he received by the webbing, and its load is transmitted to the frame. Meanwhile, when the vehicle occupant is seated, the resilient members are deflected at the webbing due to the weight of the vehicle occupant, so that the webbing is also lowered. Further, when the vehicle occupant is not seated, the lower surface of the upper seat cushion portion can be made flat.

In accordance with a sixth aspect of the present invention, in the first and second aspects of the present invention, the upper seat cushion portion is provided with a slide rail for guiding the movement of the upper seat cushion portion in a longitudinal direction of the vehicle, the slide rail having a dividing portion dividing the slide rail in a longitudinal direction thereof, the slide rail being provided in such a manner as to be bendable diagonally downward via the dividing portion when a vehicle occupant is seated.

Accordingly, when the vehicle occupant is seated, the slide rail is bent diagonally downward about a connecting portion due to the weight of the vehicle occupant. In addition, it is possible to alleviate a feeling of discomfort of the occupant when the occupant is seated.

In accordance with a seventh aspect of the present invention, in the rear seat apparatus for a vehicle according to the first and second aspects of the present invention, the upper seat cushion portion is movable between a position of a state in which a vehicle occupant is seated and a position of a forwardly laid-down state in which the upper seat cushion portion is rotated approximately 180 degrees in a forward direction of the vehicle, top plates being provided a t a bottom of the upper seat cushion portion, the top plates being divided by dividing lines extending along a transverse direction of the upper seat cushion portion, the top plates being disposed in an entire lower area of a seat frame embedded in a peripheral portion of the upper seat cushion portion, the top plates being provided in such a manner as to be capable of being deflected downward in correspondence with body characteristics of the vehicle occupant when the vehicle occupant is seated.

Accordingly, in an ordinary seating state, when the vehicle occupant is seated in the seat cushion, the tops plates over the lower seat cushion portion are deflected downward in correspondence with the figure of the vehicle occupant. Meanwhile, in the forwardly laid-down state in which the upper seat cushion portion is rotated approximately 180 degrees in the forward direction of the vehicle, the top plates are mounted on the seat frame. For this reason, even if the load is applied to the bottom surface of the upper seat cushion portion, the load can be held. Further, in the ordinary seating state, the seating comfort is not deteriorated, and in the state in which the upper seat cushion portion is laid down forward, the upper seat cushion portion can be used as the floor of a baggage compartment when the vehicle is stopped.

In accordance with an eighth aspect of the present invention, in the seventh aspect of the present invention, the top plates are connected to a seat surface layer provided in such a manner as to cover surfaces of the top plates.

Accordingly, when the vehicle occupant leaves the rear seat, the top plates return to their original states due to the restoring force of the lower seat cushion portion. Since the top plates and the seat surface layer are connected to each other, dislocation does not occur between them, and the top plates can reliably return to their original positions.

In accordance with a ninth aspect of the present invention, in the rear seat apparatus for a vehicle according to the seventh aspect of the present invention, each of the top plates has sagging preventing means for preventing each of the top plates from sagging to an inner side of the seat frame when a load is applied to the top plates in the occupant seating state and when a load is applied thereto in the forwardly laid-down state.

Accordingly, in a case where a load is applied to the top plates in the ordinary seating state, the sagging of the top plates toward the inner side of the seat frame is prevented by the sagging preventing means. Also, when a load is applied to the top plates in the forwardly laid-down state, the sagging of the top plates toward the inner side of the seat frame is prevented by the sagging preventing means.

In accordance with a 10th aspect of the present invention, in the rear seat apparatus for a vehicle according to the ninth aspect of the present invention, the sagging preventing means is provided on both sides of each of the top plates in the transverse direction of the vehicle, and is a bent portion capable of abutting against the seat frame.

Accordingly, the sagging of the top plates toward the inner side of the seat frame can be reliably prevented by a simple arrangement.

In accordance with an 11th aspect of the present invention, the rear seat apparatus for a vehicle according to the seventh aspect of the present invention further comprises: a webbing stretched between portions of the seat frame located above the top plates.

Accordingly, in a case where a load is applied to the top plates in the forwardly laid-down state, the sagging of the top plates toward the inner side of the seat frame is prevented by the webbing.

In accordance with a 12th aspect of the present invention, in the rear seat apparatus for a vehicle according to the 11th aspect of the present invention, the webbing is stretched between transversely opposite sides of the seat frame along a transverse direction thereof, a resilient member being disposed between the webbing and each of the transversely opposite sides of the seat frame, each of the top plates being connected to the webbing.

Accordingly, when the vehicle occupant leaves the rear seat, the top plates are raised by the restoring force of the rear seat cushion divisional portion, and concurrently, the top plates are able to return to their original positions by virtue of the restoring forces of the left- and right-hand pads 68 acting in the transverse direction. Further, since the top plates and the webbing are connected to each other, dislocation does not occur between them, and the top plates can be reliably returned to their original positions.

In accordance with a 13th aspect of the present invention, in the rear seat apparatus for a vehicle according to the 11th aspect of the present invention, the webbing is a pair of webbings, and the pair of webbings are stretched between vehicle longitudinal side portions of the seat frame in vicinities of transverse sides of the seat frame.

Accordingly, it suffices to use only two webbings, and since a webbing is not provided in the transversely central portions of the top plates, it is difficult for the webbings to restrict the deflection of the rear seat cushion main body portion when the vehicle occupant is seated.

In accordance with a 14th aspect of the present invention, in the rear seat apparatus for a vehicle according to the seventh aspect of the present invention, the top plates are positioned with respect to a seat surface layer which covers surfaces of the top plates, the seat surface layer being connected to the seat frame by means of a stretchable connecting member.

Accordingly, when the vehicle occupant leaves the rear seat, the top plates are raised by the restoring force of the lower seat cushion portion, and can be returned to their original positions by the restoring force of the connecting member.

The above and other objects, features and advantages of the present invention will become more apparent from the following detailed description of the invention when read in conjunction with the accompanying drawings.

DESCRIPTION OF THE PREFERRED EMBODIMENTS

Figure 1:
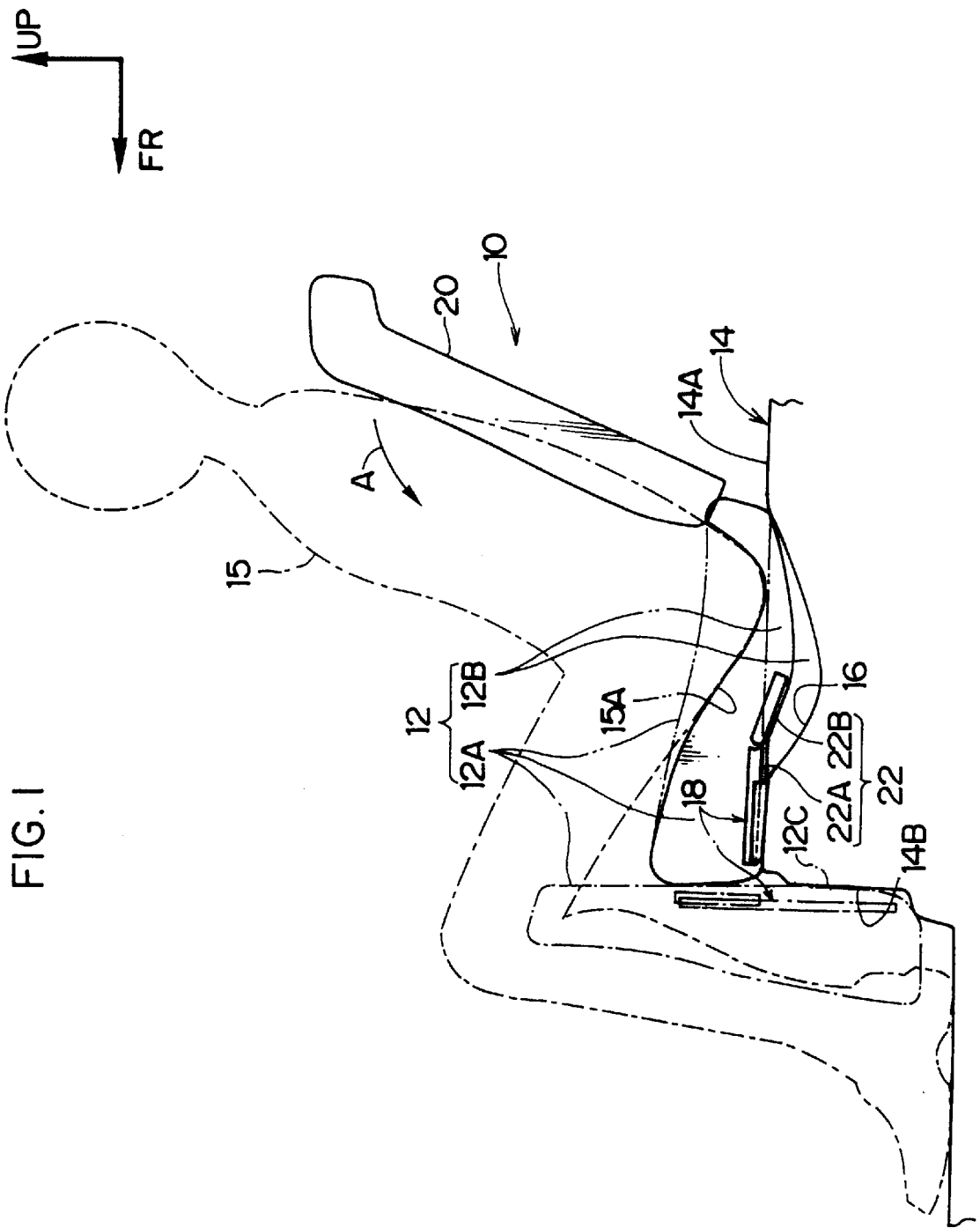
FIG. 1 is a schematic side elevational view illustrating a rear seat apparatus for a vehicle in accordance with a first embodiment of the present invention.

Referring now to FIGS. 1 to 5, a description will be given of a first embodiment of the rear seat apparatus for a vehicle in accordance with the present invention. It should be noted that in the drawings the arrow FR denotes the forward direction of the vehicle, and the arrow UP denotes the upward direction of the vehicle.

As shown in FIG. 1, a rear seat cushion 12 of a rear seat 10 in accordance with the first embodiment is disposed on a floor surface (a general floor surface) 14A of a stepped floor 14, the floor surface 14A being one step higher and located on the rear side of the vehicle. The rear seat cushion 12 can be divided and separated into two sections, i.e., an upper section and a lower section. The upper section consists of a pair of left and right rear seat cushion main body portions 12A which are rear seat cushion portions provided above the floor surface 14A. The lower section consists of a pair of left and right rear seat cushion divisional portions 12B which are rear seat cushion portions provided below the floor surface 14A.

Each rear seat cushion main body portion 12A is attached to a front end portion of the floor surface 14A by means of rotating slide mechanisms 18. By means of the rotating slide mechanisms 18, the rear seat cushion main body portion 12A can be swung approximately 90 degrees in the forward direction of the vehicle, and can then be moved downward to the position of an upright state (indicated by the chain lines in FIG. 1). At this time, the rear seat cushion divisional portion 12B remains in a recess 16 formed in the floor surface 14A.

It should be noted that a rear seat back 20 is attached to a rear portion of the rear seat cushion main body portion 12A in such a manner as to be swingable forwardly (in the direction of arrow A in FIG. 1) by means of unillustrated hinge portions.

Accordingly, when the rear seat cushion main body portions 12A are swung up with the rear seat backs 20 laid down forward, the rear seat cushion divisional portions 12B remain in the recess 16 formed in the floor surface 14A. As a result, a flat surface for a baggage compartment is provided, and since there are no projecting portions on the reverse surface of the rear seat cushion 12, a large space for the baggage compartment can be provided.

In addition, when the rear seat cushion main body portion 12A is in the upright state (at the position indicated by the chain lines in FIG. 1), practically no space is left between a vertical wall surface 14B of the floor 14 and a lower surface 12C of the rear seat cushion main body portion 12A.

Figure 2:
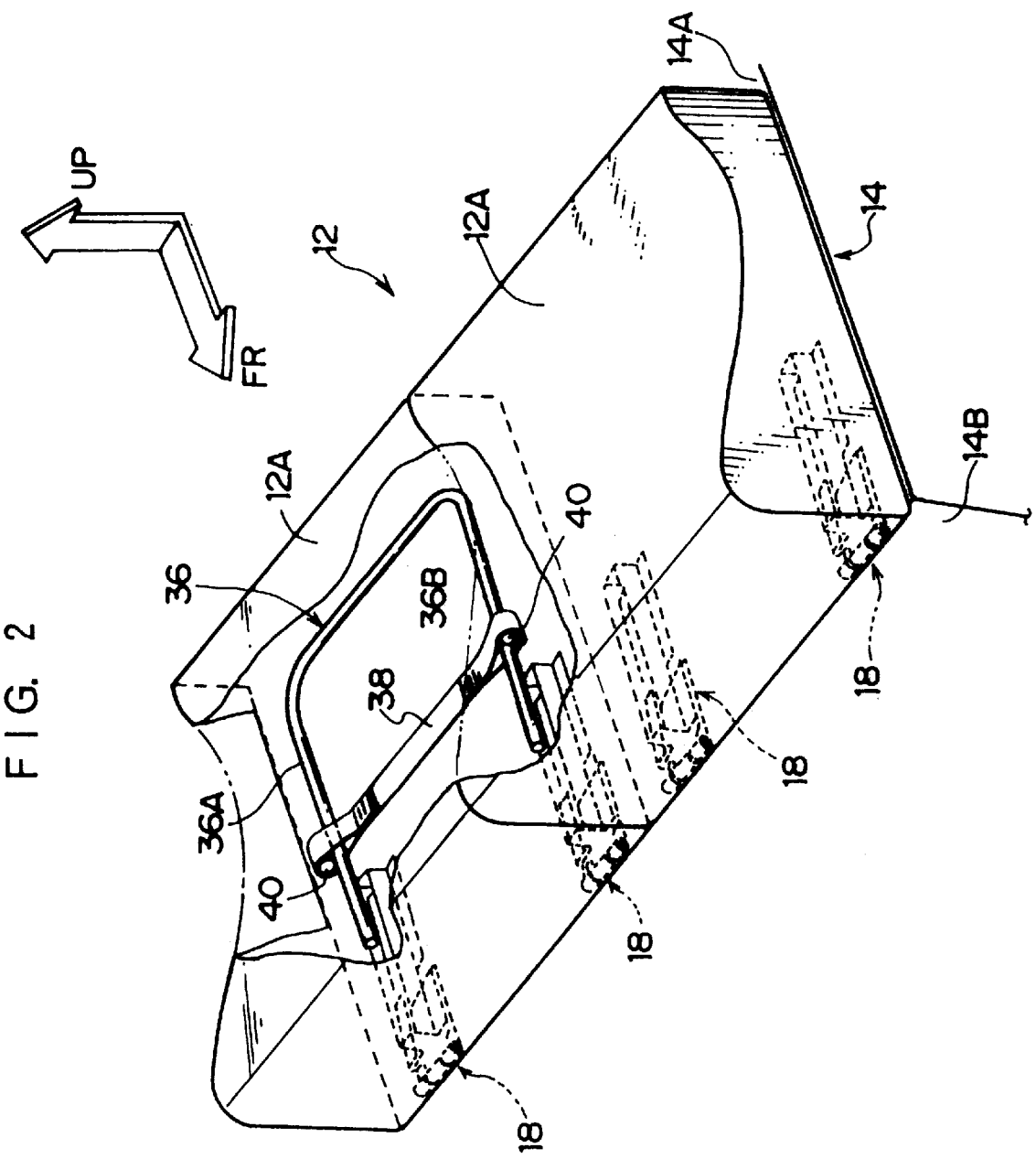
FIG. 2 is a fragmentary perspective view, taken from the diagonally forward direction of the vehicle, of a seat cushion of the rear seat apparatus for a vehicle in accordance with a first embodiment of the present invention.

As shown in FIG. 2, the rotating slide mechanisms 18 are disposed on the front side of the lower surface of each of the left and right rear seat cushion main body portions 12A at positions spaced apart from the ordinary seating position, e.g., in the vicinities of opposite ends of each of the rear seat cushion main body portions 12A in the transverse direction of the vehicle, in such a manner as to extend along the longitudinal direction of the vehicle, respectively.

Figure 3:
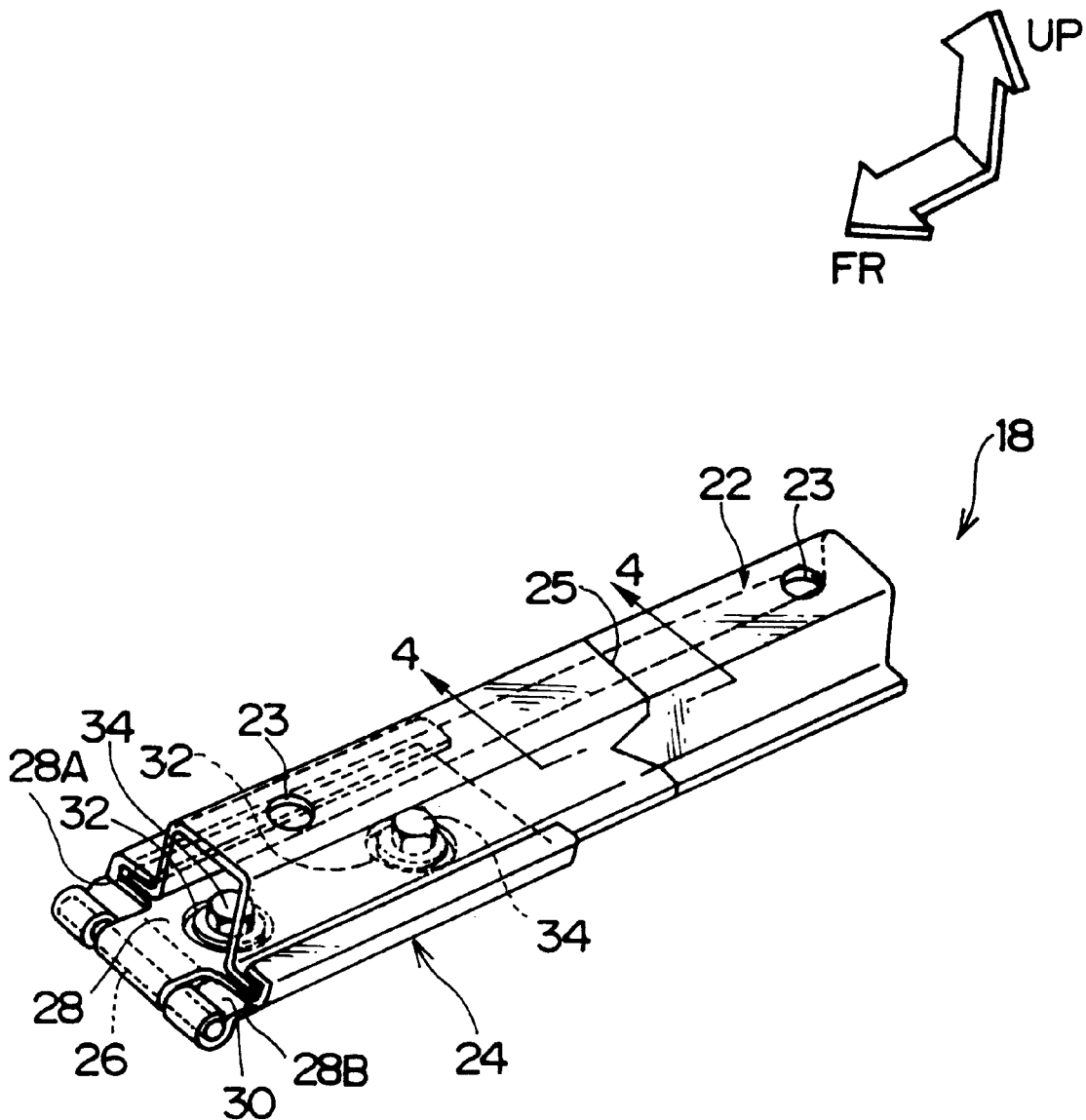
FIG. 3 is a perspective view, taken from the diagonally forward direction of the vehicle, of a rotating slide mechanism of the rear seat apparatus for a vehicle in accordance with the first embodiment of the present invention.

As shown in FIG. 3, the rotating slide mechanism 18 is comprised of a rail 22 serving as a slide rail attached to a lower portion of the rear seat cushion main body portion 12A as well as a hinge portion 24 attached to the floor 14.

A pair of attaching holes 23 are provided in the rail 22 at longitudinally opposite sides thereof. The rail 22 is fixed to the rear seat cushion main body portions by bolts (not shown) inserted in these attaching holes 23, in such a manner as to extend in the longitudinal direction of the vehicle. The hinge portion 24 is formed by a pin 26 whose central axis is provided flush with the floor surface 14A and which extends in the transverse direction of the vehicle; an upper plate 28 to which the rail 22 is slidably attached; and a lower plate 30. The upper plate 28 is swingable about the pin 26 with respect to the lower plate 30. The lower plate 30 is fixed to the floor by bolts 34 which are accommodated in a longitudinal pair of through holes 32 formed in the upper plate 28.

Accordingly, when the rear seat cushion main body portion 12A is swung up approximately 90 degrees, the rail 22 on the rear seat cushion main body portion side is adapted to slide along a transverse pair of grooves 28A and 28B (see FIG. 3) provided in the upper plate 28. For this reason, the rear seat cushion main body portion 12A moves along the direction of arrow B in FIG. 5, and thus moves from the position indicated by the chain lines to the position indicated by the solid lines (upright state).

It should be noted that in an ordinary state the rear seat cushion main body portion 12A is locked at its rear portion to the floor 14 (illustration is omitted), and as a plurality of locking positions are provided for rear seat cushion main body portion 12A, the rear seat apparatus for a vehicle is provided with a seat sliding mechanism during the normal use of the rear seat.

Figure 4:
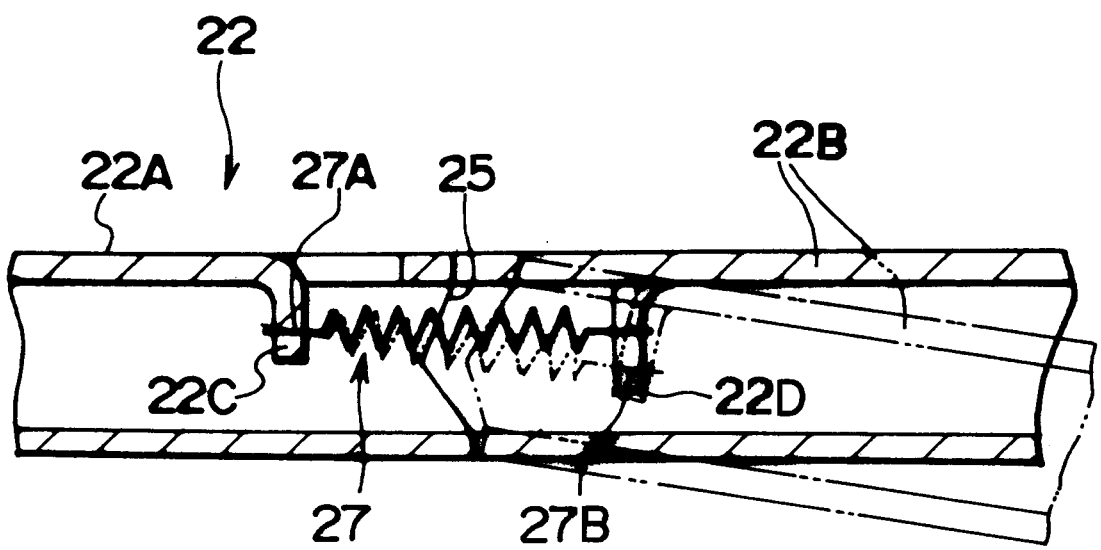
FIG. 4 is an enlarged cross-sectional view taken along line 4—4 of FIG. 3.
Figure 5:
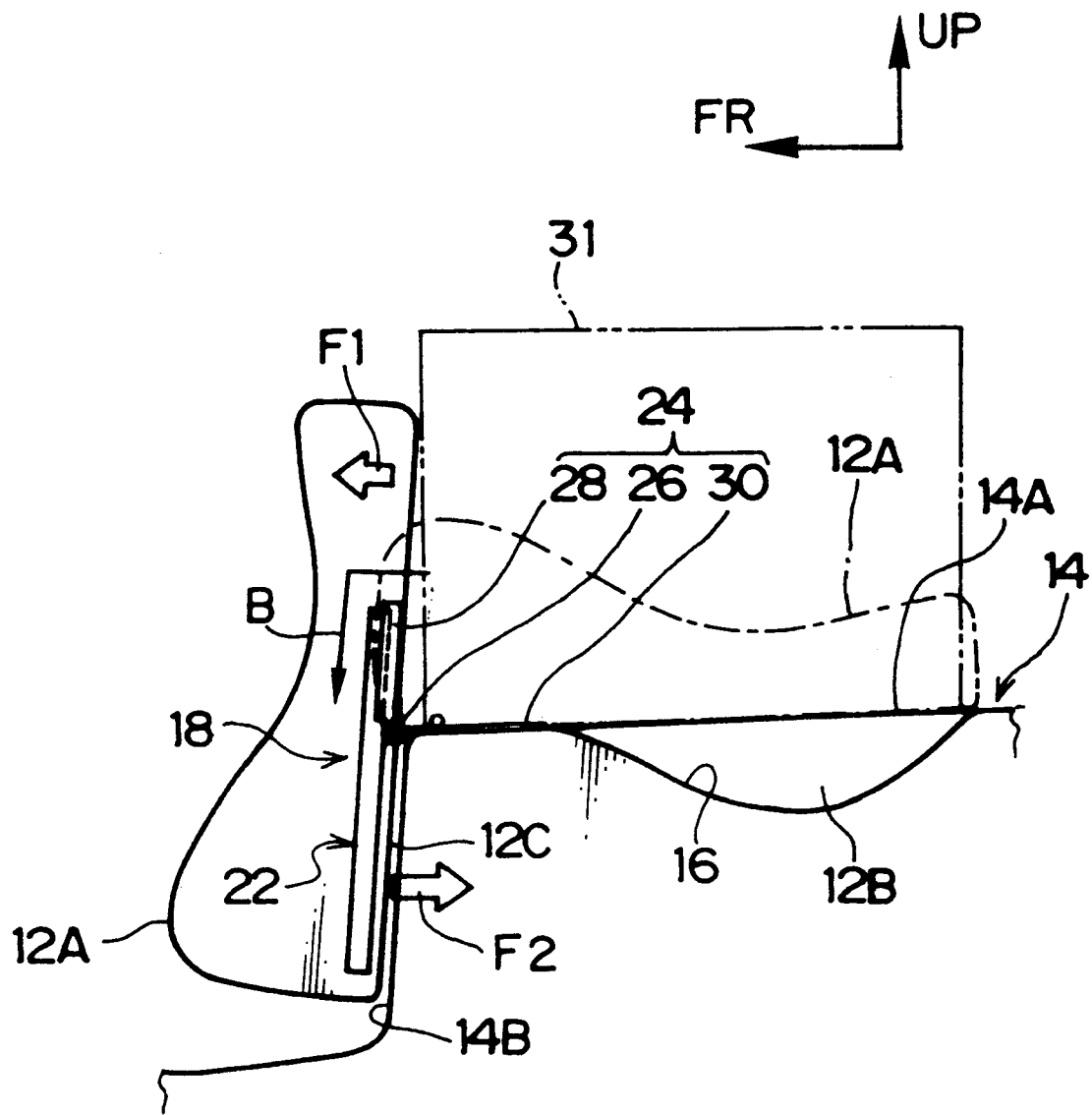
FIG. 5 is a schematic side elevational view illustrating the operation of the rear seat apparatus for a vehicle in accordance with the first embodiment of the present invention.

As shown in FIG. 4, the rail 22 is divided into two parts, a front portion 22A and a rear portion 22B, at a longitudinally intermediate portion of the rail 22. A dividing portion 25 between the front portion 22A and the rear portion 22B in a side view has a V-shape which is open toward the rear, and ends 27A and 27B of a tensile coil spring 27 are disposed at the front portion 22A and the rear portion 22B with the dividing portion 25 located therebetween. The ends 27A and 27B of the coil spring 27 are respectively engaged with a cutout 22C formed in the front portion 22A and a cutout 22D formed in the rear portion 22B.

Accordingly, when the vehicle occupant is seated, the rear portion 22B is bent diagonally downward against the urging force of the coil spring 27 by means of a pressing force applied from above, and assumes the position indicated by the two-dotted dash lines in FIG. 4. When the pressing force from above is canceled, the rear portion 22B returns to the original position (the position indicated by the solid lines in FIG. 4) by means of the urging force of the coil spring 27.

In this first embodiment, as shown in FIG. 2, a frame 36, which is formed by bending a pipe substantially into a U-shape, is disposed in a peripheral portion of a lower portion of the rear seat cushion main body portion 12A. The frame 36 is arranged to be swung up integrally with the rear seat cushion main body portion 12A. Further, a webbing 38 is stretched between a leg portion 36A and a leg portion 36B of the frame 36 along the transverse direction of the vehicle. In a case where the rear seat cushion main body portion 12A is in an upright state and the baggage has moved forward, the baggage is temporarily received by the webbing 38, and its load is transmitted to the frame 36.

Further, a pad 40 serving as a resilient member is inserted between each of the leg portions 36A and 36B of the frame 36 and the webbing 38. The arrangement provided is such that when the rear seat cushion main body portion 12A is in a state allowing the vehicle occupant to be seated in it, and when a vehicle occupant 15 is seated, the weight of the occupant deflects the pads 40 by means of the webbing 38, so that the webbing 38 can also be lowered. Hence, the deflection of the rear seat cushion 12 is not hampered. When the occupant is not seated, the pads 40 restore their original shapes, thereby flattening the lower surface of the rear seat cushion main body portion 12A.

The rear seat cushion main body portions 12A and the rear seat backs 20 are provided in twos, one on the driver seat side and the other on the passenger seat side (they are provided in twos at a dimensional ratio of 6:4, for example, on the left- and right-hand sides). The rear seat cushion main body portion 12A and the rear seat back 20 on the driver seat side can be swung to the upright state in which they are rotated substantially 90 degrees in the forward direction, while the rear seat cushion main body portion 12A and the rear seat back 20 on the passenger seat side can be set in the upright state in which they are rotated substantially 90 degrees in the forward direction and in the forwardly laid-down state in which they are rotated substantially 180 degrees in the forward direction.

Next, a description will be given of the operation in accordance with the first embodiment.

In the rear seat apparatus for a vehicle in accordance with the first embodiment, the rear seat cushion 12 is divided at the general surface 14A of the floor 14 into the rear seat cushion main body portions 12A and the rear seat cushion divisional portions 12B, and the rear seat cushion divisional portions 12B are accommodated in the recess 16 in the floor 14. Accordingly, when the vehicle occupant is seated, the rear seat cushion main body portion 12A and the rear seat cushion divisional portion 12B sag by undergoing compressive deformation. Since the vehicle occupant is supported by these seat cushion portions, it is possible to secure a sufficient seat cushion thickness.

Also, when the vehicle occupant is seated, the rear portion 22B of the rail 22 of each rotating slide mechanism 18 is bent diagonally downward against the urging force of the coil spring 27 by means of a pressing force applied from above, and assumes the position indicated by the two-dotted dash lines in FIG. 4. Hence, it is possible to alleviate an uncomfortable feeling of the vehicle occupant.

In addition, since the buttocks 15A of the vehicle occupant 15 are supported by the recess 16 formed in the floor surface 14A, it is possible to prevent the submarine phenomenon without separately providing a submarine-phenomenon preventing member.

Accordingly, it is possible to improve the cushioning feature of the rear seat cushion 12 without a substantial increase in the weight.

Additionally, the seat characteristics can be adjusted by modifying the rear seat cushion divisional portions 12B together with the recess 16 formed in the floor surface 14A. Therefore, since it is possible to cope with vehicles having different floor shapes, such as front engine front drive (FF) vehicles and four wheel drive (4WD) vehicles belonging to the same vehicle type, by simply modifying the rear seat cushion divisional portions 12B, the rear seat cushion main body portions 12A which are design components can be used in common.

Further, when the rear seat cushion main body portions 12A with the rear seat backs 20 laid down are swung up, it is possible to provide a flat baggage compartment surface. Furthermore, since there are no projections on the rear surfaces of the swung-up rear seat cushion main body portions 12A, it is possible to provide a large space for the baggage compartment.

At the same time, after the rear seat cushion main body portions 12A with the rear seat backs 20 laid down are swung up by being rotated approximately 90 degrees in the forward direction by the rotating slide mechanisms 18 provided at the lower surfaces of the rear seat cushion main body portions 12A, the rear seat cushion main body portions 12A and the rear seat backs 20 can be slid downward and accommodated at the position indicated by the chain lines in FIG. 1. As a result, the rear seat cushion main body portions 12A and the rear seat backs 20 can be set to a low position, thereby facilitating the loading or unloading of the baggage from the front seat side.

Since the rear seat cushion main body portions 12A can be accommodated without a gap between the same and the vertical wall surface 14B of the floor 14, it is possible to prevent the baggage from falling into the gap between the vertical wall surface 14B and the rear seat cushion main body portions 12A. Further, in the event that an impact is applied to the vehicle from the front side of the vehicle and a load is applied to the rear surface of the rear seat cushion main body portion 12A in the forward direction of the vehicle (in the direction of arrow F1 in FIG. 5) due to the baggage 31, the rear seat cushion main body portion 12A tends to swing about the pins 26. Namely, the lower portion of the rear seat cushion main body portion 12A tends to swing backward. At this time, since the rear surface 12C of the lower portion of the rear seat cushion main body portion 12A abuts against the vertical wall surface 14B of the vehicle floor 14, the load acting on the rear seat cushion main body portion 12A (in the direction of arrow F2 in FIG. 5) can be received by the vertical wall surface 14B. Consequently, it is unnecessary to separately provide a reinforcing member for supporting the rear seat cushion main body portion 12A, so that the forward movement of the seat cushion due to the baggage can be prevented reliably.

In addition, in the event that an impact is applied to the vehicle from the front side of the vehicle and the baggage moves forward, the baggage can be temporarily received by the webbing 38, and its load can be reliably transmitted to the frame 36.

Figure 6:
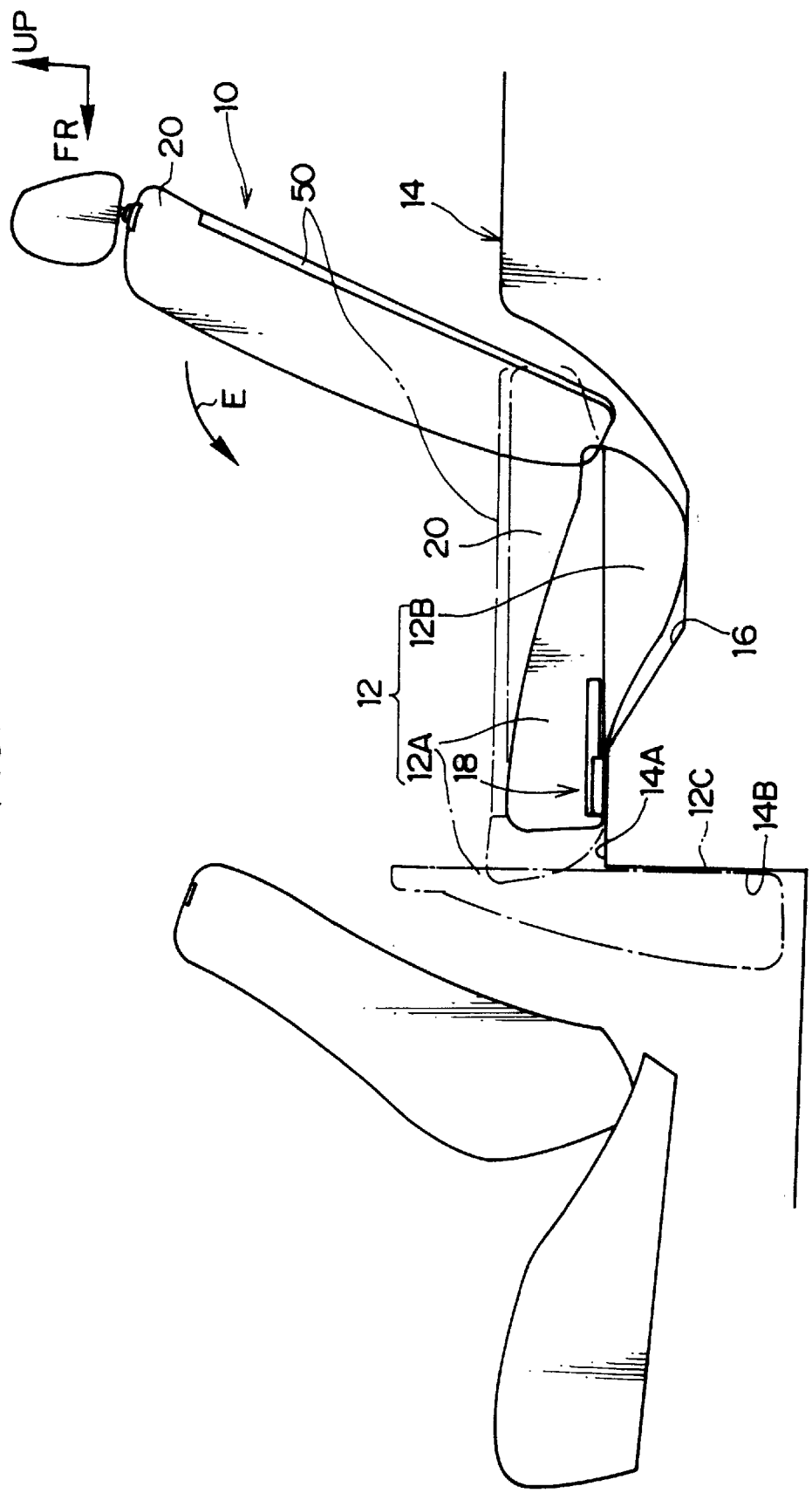
FIG. 6 is a schematic side elevational view illustrating a rear seat apparatus for a vehicle in accordance with a second embodiment of the present invention.

Next, referring to FIG. 6, a description will be given of a second embodiment of the rear seat apparatus for a vehicle in accordance with the present invention. Incidentally, the same members as those of the first embodiment will be denoted by the same reference numerals, and a description thereof will be omitted.

In the rear seat apparatus for a vehicle in accordance with the second embodiment, the rear seat cushion divisional portion 12B is formed by a bag in which a liquid such as water or a sol-like fluid is sealed. The rear seat back 20 is attached to the floor 14 in such a manner as to be swingable in the forward direction (in the direction of arrow E in FIG. 6) by hinge portions (not shown) provided on the floor 14. A board 50 is disposed on the rear surface of the rear seat back 20. When the rear seat cushion main body portion 12A is swung up and moved to the position indicated by the chain line in FIG. 6 and the rear seat back 20 is laid down forward and is set in the position indicated by the chain lines, the board 50 is located over the rear seat cushion divisional portion 12B.

Accordingly, in the rear seat apparatus for a vehicle in accordance with the second embodiment, the weight of the vehicle occupant who is seated is dispersed to a wide range by the liquid such as water or the sol-like fluid sealed in the bag of the rear seat cushion divisional portion 12B. Hence, it is possible to prevent only a central seating portion from being subjected to a strong reaction force from the floor. Further, even in cases where seat types differ due to the difference in the shape of the floor where the rear seat is placed in FF vehicles and 4WD vehicles belonging to the same vehicle type, if the total capacities of the rear seat cushion divisional portions 12B are similar, the rear seat cushion divisional portions 12B can be used in common by virtue of the deformation of the bags even if the shapes of the recesses 16 are slightly different.

In addition, when the rear seat back 20 is laid down forward, the board 50 is located over the rear seat cushion divisional portion 12B. Hence, when the baggage is loaded, the rear seat cushion divisional portion 12B does not sag by being subjected to compressive deformation, so that deterioration of the baggage loading feature does not result.

Next, referring to FIGS. 7 to 10, a description will be given of a third embodiment of the rear seat apparatus for a vehicle in accordance with the present invention. Incidentally, the same members as those of the first embodiment will be denoted by the same reference numerals, and a description thereof will be omitted.

Figure 7:
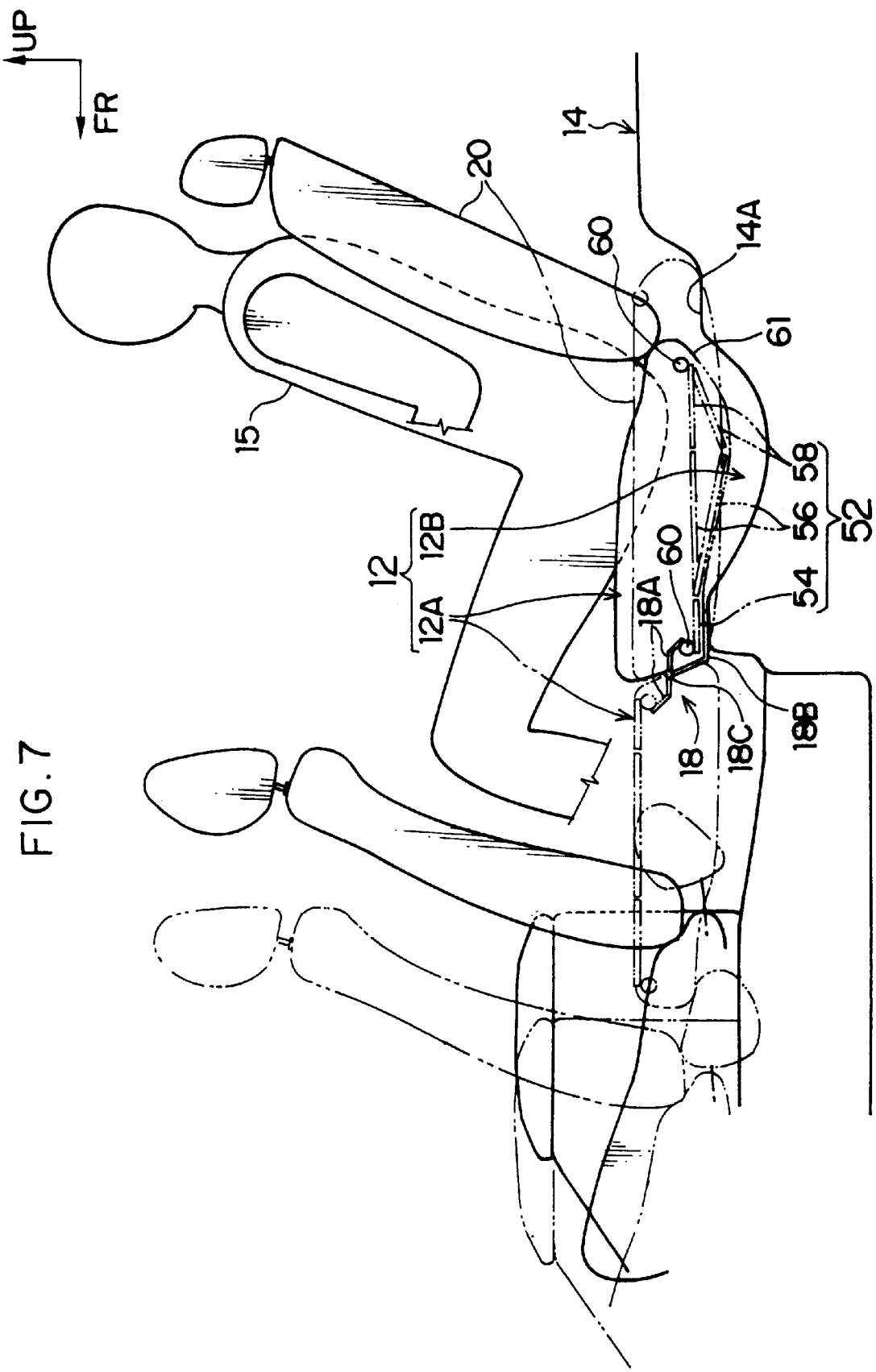
FIG. 7 is a schematic side elevational view illustrating a rear seat apparatus for a vehicle in accordance with a third embodiment of the present invention.

As shown in FIG. 7, in the third embodiment, a rotating mechanism 18 for rotating the rear seat cushion main body portion 12A is mainly comprised of an upper plate 18A attached to a seat frame 60 of the rear seat cushion main body portion 12A and a lower plate 18B attached to the floor 14, and a center of a hinge 18C is located in the vicinity of a heightwise central position of the rear seat cushion main body portion 12A. Accordingly, even if the rear seat cushion main body portion 12A is rotated approximately 180 degrees (to the state indicated by the two-dotted dash lines in FIG. 7), the rotating mechanism 18 does not project above the upper surface of the rear seat cushion main body portion 12A.

In addition, since the rotating mechanism 18 is nipped by the rear seat back 20 laid down forward (in the state indicated by the two-dotted chain lines in FIG. 7) and the rear seat cushion main body portion 12A without a gap, the rotating mechanism 18 is not exposed at the surfaces of the rear seat back 20 and the rear seat cushion main body portion 12A.

A top plate 52 is disposed at the bottom of the rear seat cushion main body portion 12A. The top plate 52 is formed of a material having appropriate rigidity, such as plywood or a resin, and is divided into three parts, a first top plate 54, a second top plate 56, and a third top plate 58 by two dividing lines extending in the transverse direction of the rear seat cushion main body portion 12A in parallel with the transverse direction of the vehicle.

Figure 8:
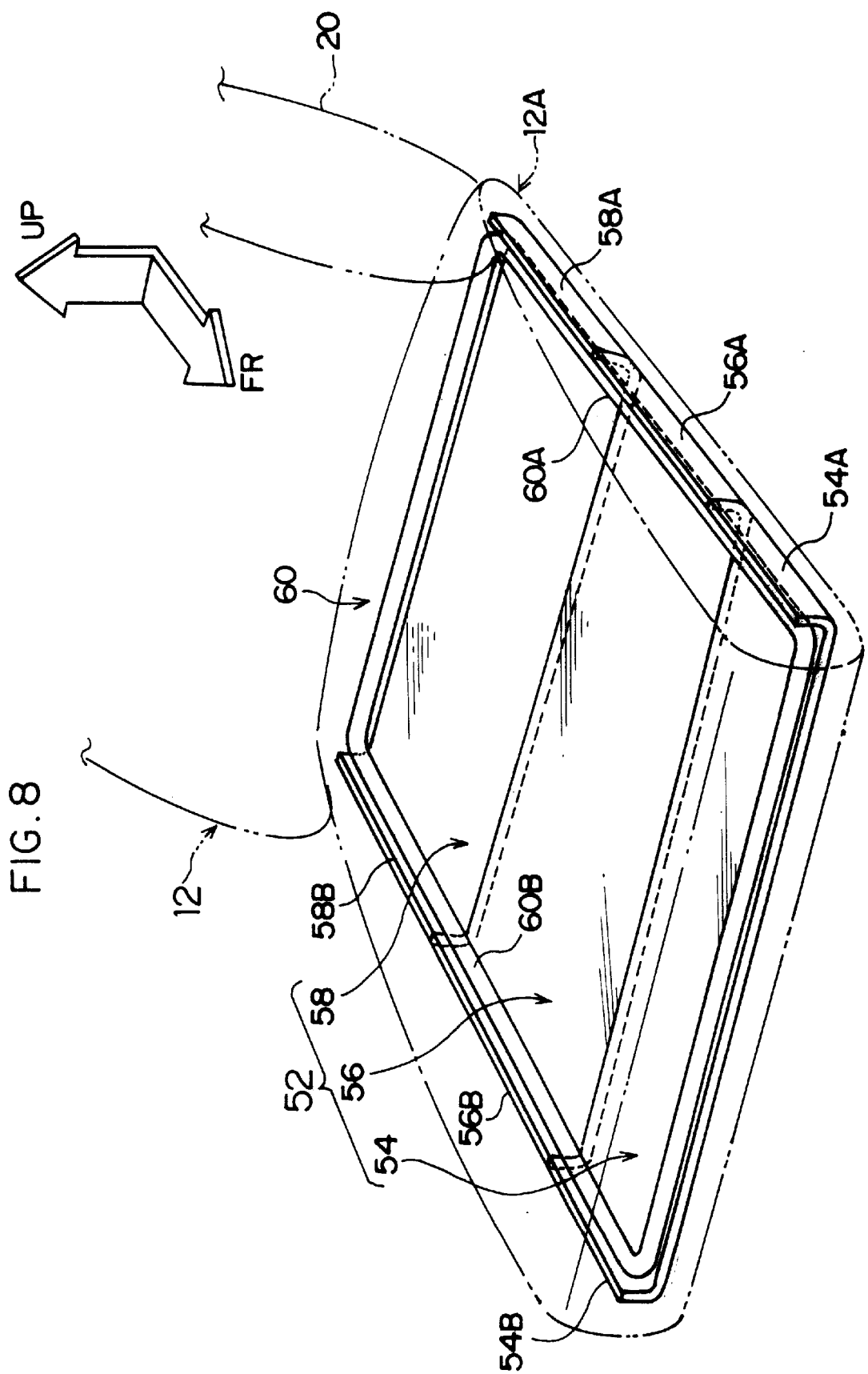
FIG. 8 is a perspective view, taken from the diagonally forward direction of the vehicle, of the seat cushion of the rear seat apparatus for a vehicle in accordance with the third embodiment of the present invention.

As shown in FIG. 8, the top plate 52 is disposed in the entire lower area of the seat frame 60. When the rear seat cushion main body portion 12A is rotated approximately 180 degrees in the forward direction of the vehicle and is set in the forwardly laid-down state (the state indicated by the two-dotted dash lines in FIG. 7), the first top plate 54, the second top plate 56, and the third top plate 58 are mounted on the seat frame 60, even if a load is applied to the bottom surface of the rear seat cushion main body portion 12A turned over in the forwardly laid-down state, the load can be held.

As shown in FIG. 7, the second top plate 56 and the third top plate 58 are located over the rear seat cushion divisional portion 12B. When the rear seat cushion main body portion 12A is in the ordinary seating state (the state indicated by the solid lines in FIG. 7) and the vehicle occupant 15 is seated, the second top plate 56 and the third top plate 58 rotate downward about the former's front end and the latter's rear end, respectively, in correspondence with the figure of the vehicle occupant 15. Incidentally, the first top plate 54 is not deflected downward when the vehicle occupant is seated since it is located in front of the rear seat cushion divisional portion 12B.

When the vehicle occupant 15 rises up from the rear seat cushion 12, the second top plate 56 and the third top plate 58 rotate about the front end of the second top plate 56 and the rear end of the third top plate 58, respectively, and return to their original states by virtue of the restoring force of the rear seat cushion divisional portion 12B.

The front end of the second top plate 56 and the rear end of the third top plate 58 are respectively connected to a seat surface layer 61 by sewing or the like so that dislocation will not occur between each of the second top plate 56 and the third top plate 58 and the seat surface layer 61.

As shown in FIG. 8, left- and right-hand sides of the first top plate 54, the second top plate 56, and the third top plate 58 in the transverse direction of the vehicle are bent in such a manner as to be capable of abutting against both sides 60A and 60B of the seat frame 60, thereby forming bent portions 54A, 54B, 56A, 56B, 58A, and 58B serving as sagging preventing means.

Figure 9:
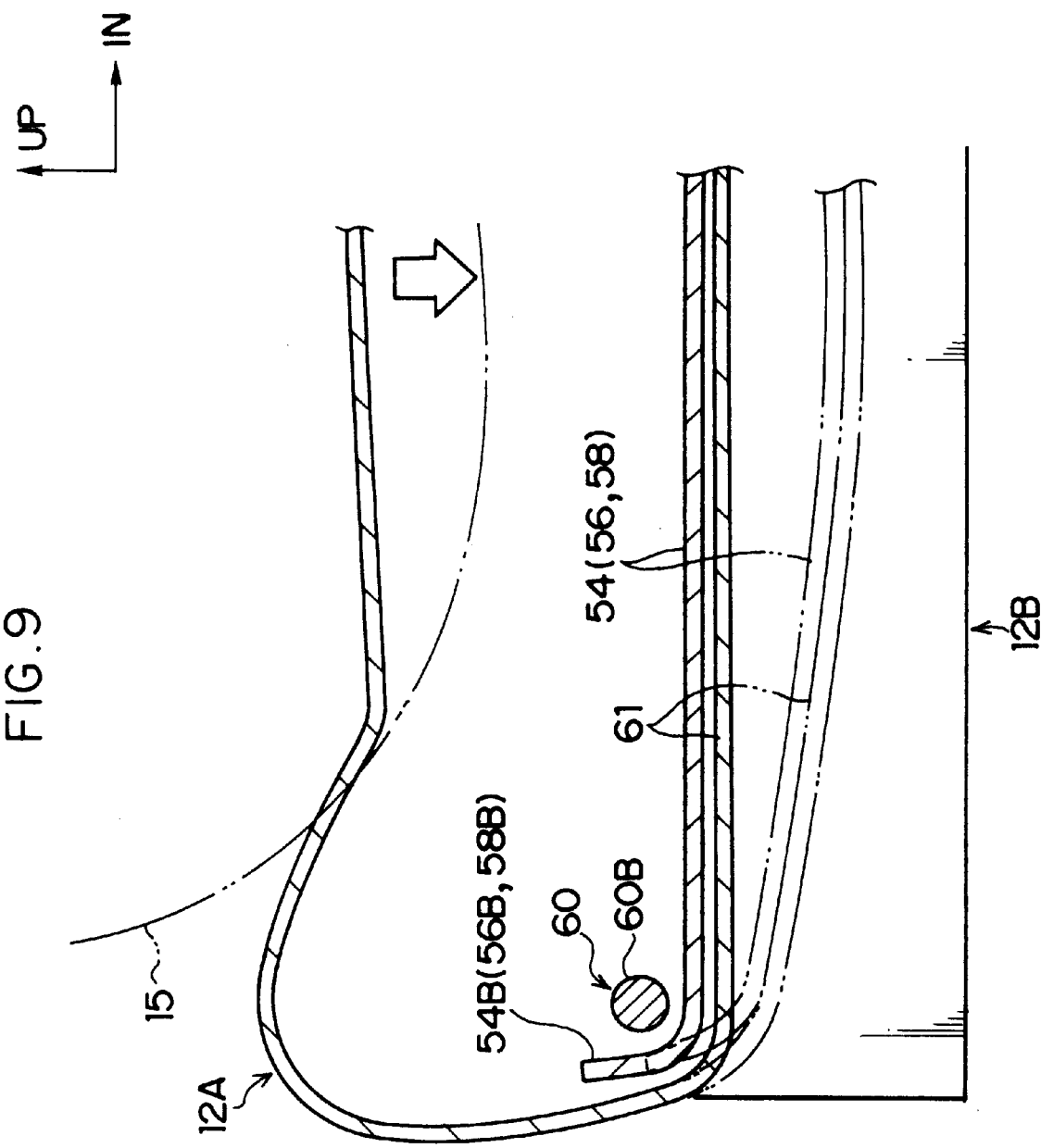
FIG. 9 is a cross-sectional view illustrating a right-hand half of the seat cushion, which is in an ordinary seating state, of the rear seat apparatus for a vehicle in accordance with the third embodiment of the present invention.

The transverse length of each of the first top plate 54, the second top plate 56, and the third top plate 58, including the bent portions on the left- and right-hand sides, is set to such a length that each of the bent portions 54B, 56B, and 58B on the right-hand side and each of the bent portions on the left-hand side (not shown in FIG. 9) will not be dislocated from the right-hand side 60B of the seat frame 60 and the left-hand side thereof (not shown in FIG. 9), respectively, when the vehicle occupant 15 is seated and the first top plate 54, the second top plate 56, and the third top plate 58 move downward and assume the state indicated by the two-dotted dash line in FIG. 9.

Figure 10:
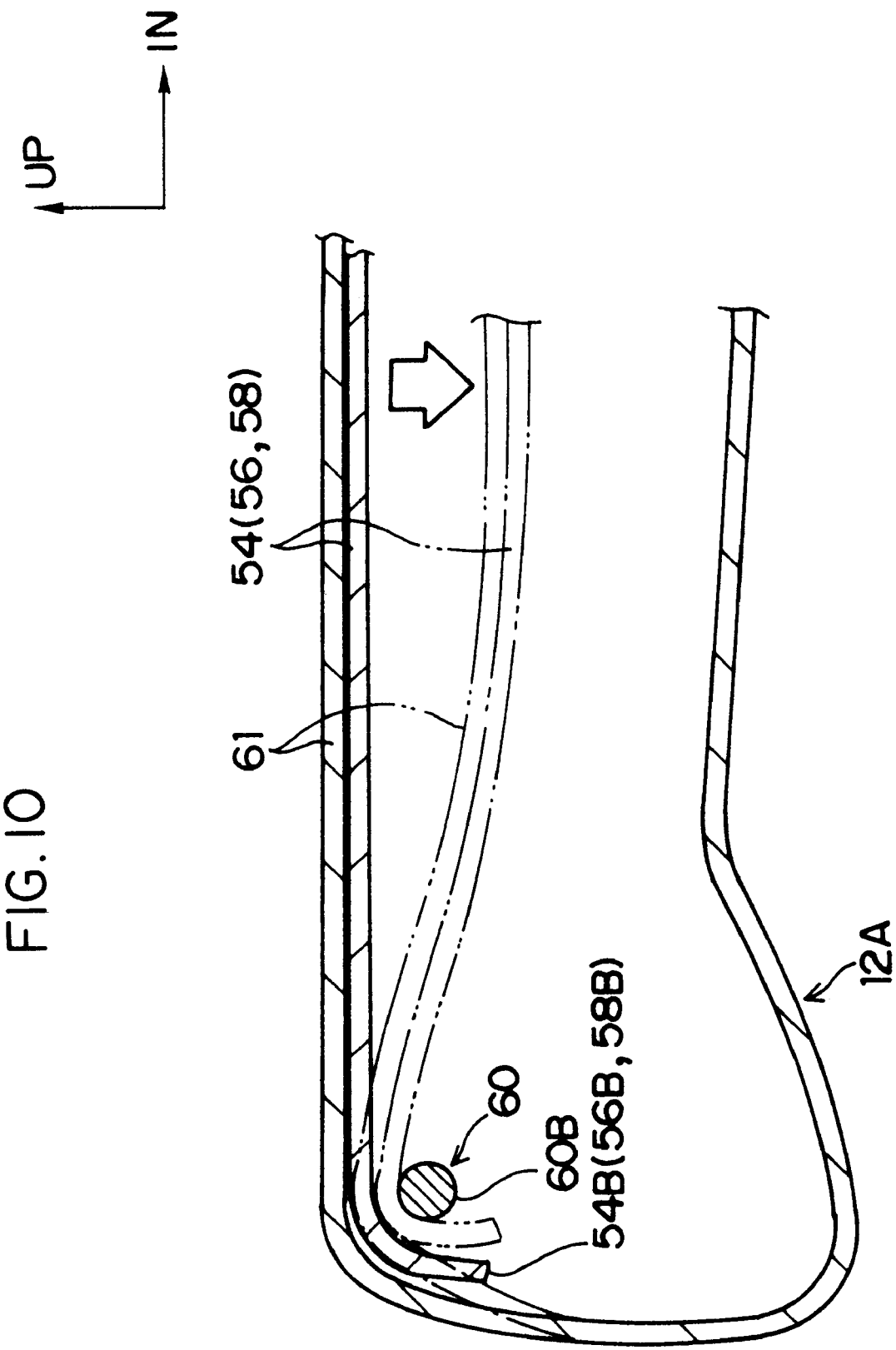
FIG. 10 is a cross-sectional view illustrating a right-hand half of the seat cushion, which is in a forwardly laid-down state, of the rear seat apparatus for a vehicle in accordance with the third embodiment of the present invention.

In addition, the arrangement provided is such that in a case where the rear seat cushion main body portion 12A is rotated approximately 180 degrees in the forward direction of the vehicle, as shown in FIG. 10, and is set in the forwardly laid-down state, when a load is applied to the first top plate 54, the second top plate 56, and the third top plate 58, each of the bent portions 54B, 56B, and 58B on the right-hand side and each of the bent portions on the left-hand side (not shown in FIG. 10) is caught by the right-hand side 60B of the seat frame 60 and the left-hand side thereof (not shown in FIG. 10), respectively.

Next, a description will be given of the operation in accordance with the third embodiment.

In the rear seat apparatus for a vehicle in accordance with the third embodiment, when the rear seat cushion main body portion 12A is in the ordinary seating state and the vehicle occupant 15 is seated, the second top plate 56 and the third top plate 58 located over the rear seat cushion divisional portion 12B rotate downward about the former's front end and the latter's rear end, respectively, in correspondence with the figure of the vehicle occupant 15, thereby assuming the state indicated by the three-dotted dash line in FIG. 7. Consequently, the seating comfort does not deteriorate.

Further, in a case where the rear seat cushion main body portion 12A is rotated approximately 180 degrees in the forward direction of the vehicle and is set in the forwardly laid-down state, the first top plate 54, the second top plate 56, and the third top plate 58 are placed on the seat frame 60. Consequently, even if a load is applied to the bottom surface of the rear seat cushion main body portion 12A turned over in the forwardly laid-down state, the load can be held. Accordingly, these top plates can withstand a local load such as when a passenger puts his or her hand on them, the bottom surface of the rear seat cushion main body portion 12A turned over in the forwardly laid-down state can also be used as that of a passenger compartment when the vehicle is stopped.

When the vehicle occupant 15 who was seated rises up from the rear seat cushion 12, the second top plate 56 and the third top plate 58 rotate about the front end of the second top plate 56 and the rear end of the third top plate 58, respectively, and return to their original states by virtue of the restoring force of the rear seat cushion divisional portion 12B. At this time, since the front end of the second top plate 56 and the rear end of the third top plate 58 are respectively connected to the seat surface layer 61 by sewing or the like, dislocation does not occur between each of the second top plate 56 and the third top plate 58 and the seat surface layer 61. Hence, the second and third top plates 56 and 58 can be reliably restored to their original states.

In addition, the transverse length of each of the first top plate 54, the second top plate 56, and the third top plate 58, including the bent portions on the left- and right-hand sides, is set to such a length that each of the bent portions 54B, 56B, and 58B on the right-hand side and each of the bent portions on the left-hand side (not shown in FIG. 9) will not be dislocated from the right-hand side 60B of the seat frame 60 and the left-hand side thereof (not shown in FIG. 9), respectively, when the vehicle occupant 15 is seated and the first top plate 54, the second top plate 56, and the third top plate 58 move downward. As such, the first top plate 54, the second top plate 56, and the third top plate 58 do not sag toward the inner side of the seat frame 60.

In addition, the arrangement provided is such that in a case where the rear seat cushion main body portion 12A is set in the forwardly laid-down state, when a load is applied to the first top plate 54, the second top plate 56, and the third top plate 58, each of the bent portions 54B, 56B, and 58B on the right-hand side and each of the bent portions on the left-hand side (not shown in FIG. 10) is caught by the right-hand side 60B of the seat frame 60 and the left-hand side thereof (not shown in FIG. 10), respectively. In such a case as well, the first top plate 54, the second top plate 56, and the third top plate 58 do not sag toward the inner side of the seat frame 60.

In addition, since the sagging preventing means is formed by the bent portions 54A, 54B, 56A, 56B, 58A, and 58B, it is possible to prevent the first top plate 54, the second top plate 56, and the third top plate 58 from sagging to the inner side of the seat frame 60 by a simple arrangement.

Next, referring to FIGS. 11 to 13, a description will be given of a fourth embodiment of the rear seat apparatus for a vehicle in accordance with the present invention. Incidentally, the same members as those of the third embodiment will be denoted by the same reference numerals, and a description thereof will be omitted.

Figure 11:
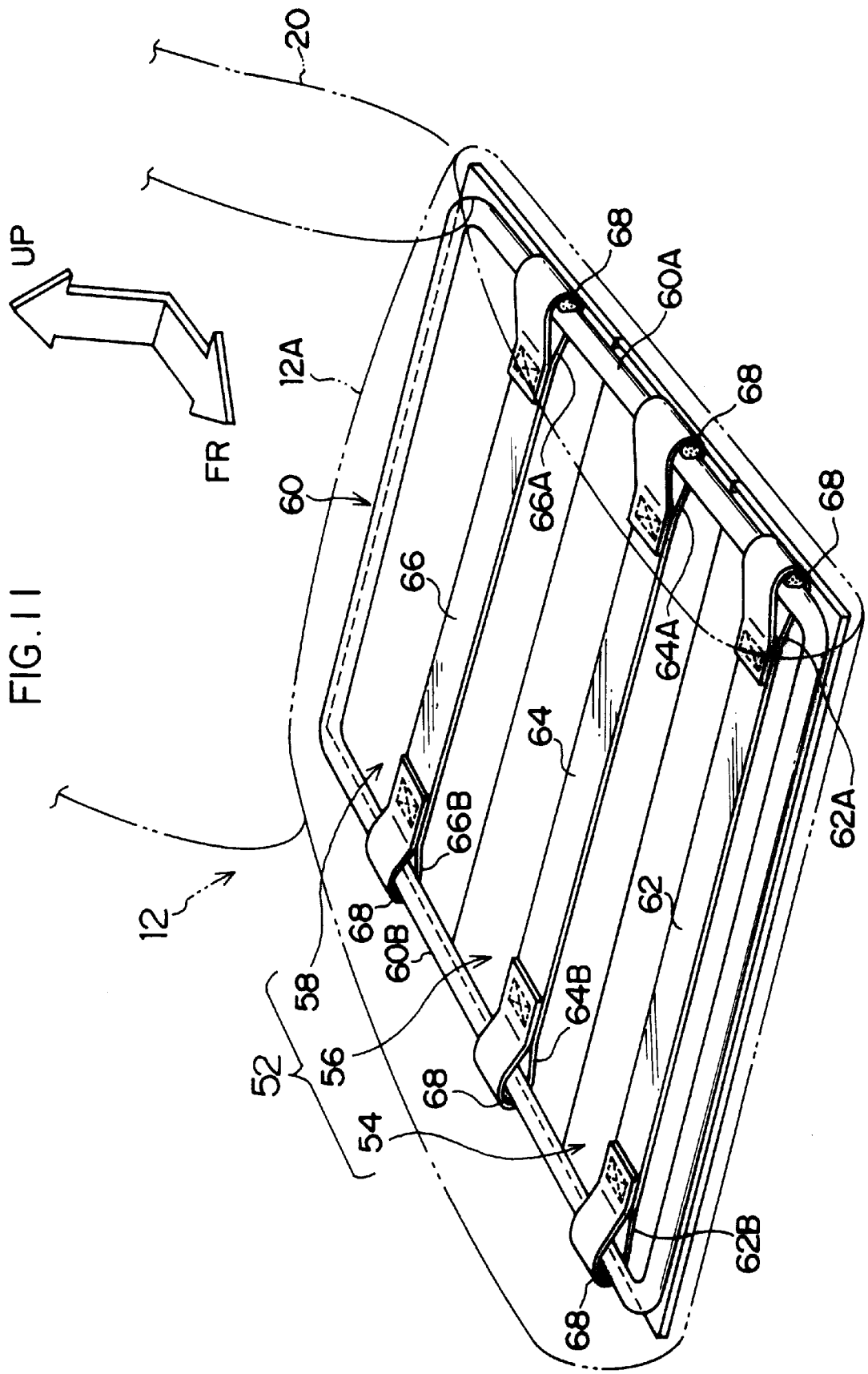
FIG. 11 is a perspective view, taken from the diagonally forward direction of the vehicle, of the seat cushion of the rear seat apparatus for a vehicle in accordance with a fourth embodiment of the present invention.

As shown in FIG. 11, in the fourth embodiment, instead of forming the bent portions at the left- and right-hand sides of the first top plate 54, the second top plate 56, and the third top plate 58, a first webbing 62, a second webbing 64, and a third webbing 66 are respectively stretched above the first top plate 54, the second top plate 56, and the third top plate 58 in the transverse direction of the seat cushion, which is parallel with the transverse direction of the vehicle. In addition, opposite ends 62A, 62B, 64A, 64B, 66A, and 66B of the first webbing 62, the second webbing 64, and the third webbing 66 are attached to the left- and right-hand sides 60A and 60B of the seat frame 60.

Figure 12:
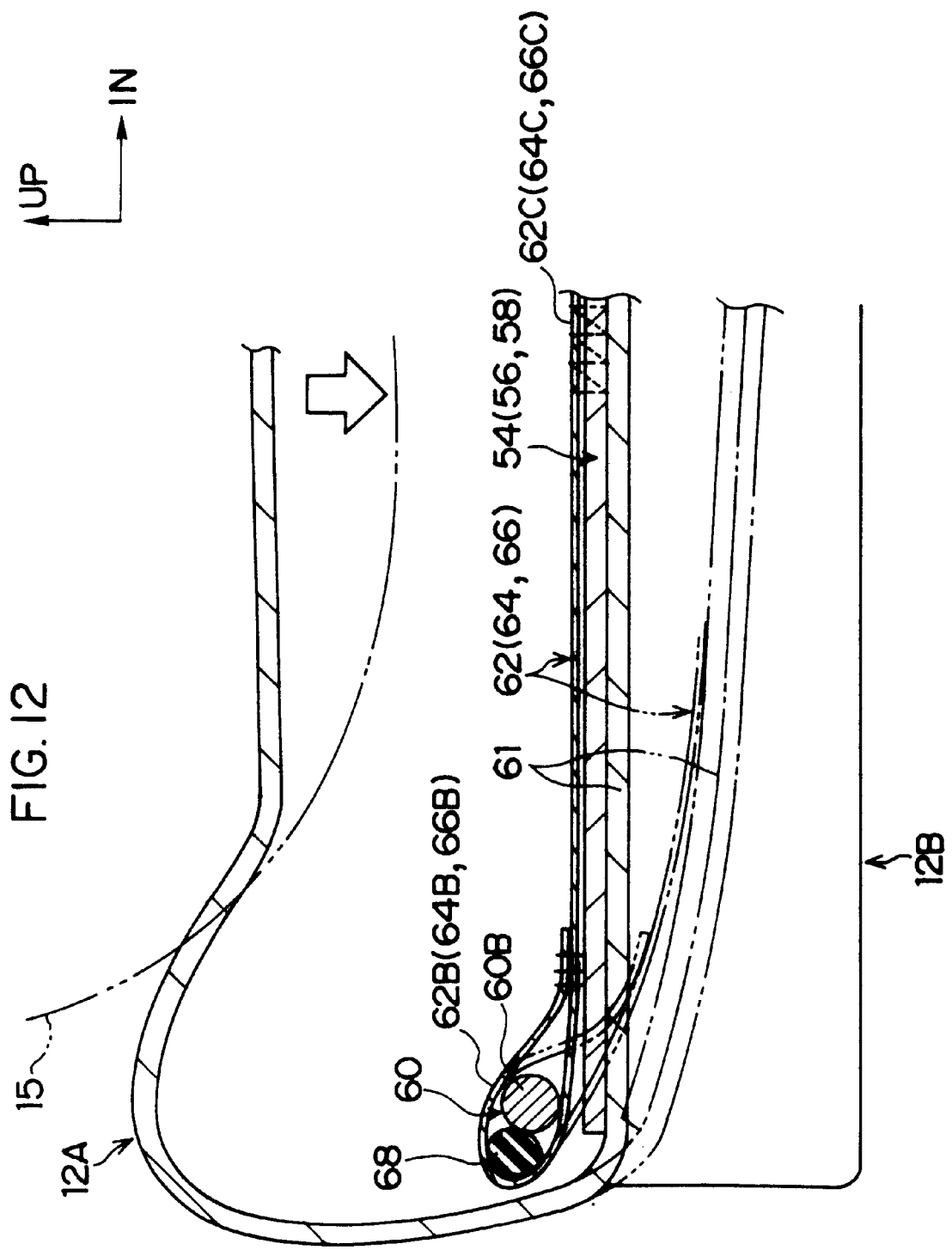
FIG. 12 is a cross-sectional view illustrating a right-hand half of the seat cushion, which is in the ordinary seating state, of the rear seat apparatus for a vehicle in accordance with the fourth embodiment of the present invention.

As shown in FIG. 12, the right-hand ends 62B, 64B, and 66B of the first webbing 62, the second webbing 64, and the third webbing 66 as well as the left-hand ends thereof (not shown in FIG. 12) are formed in annular shapes. A cylindrical pad 68 serving as a resilient member is disposed between each of the first webbing 62, the second webbing 64, and the third webbing 66 and the right-hand side 60B of the seat frame 60 (and the left-hand side not shown in FIG. 12). In addition, transversely central portions 62C, 64C, and 66C of the first webbing 62, the second webbing 64, and the third webbing 66 are positioned with respect to transversely central portions 54C, 56C, and 58C of the first top plate 54, the second top plate 56, and the third top plate 58 by sewing or the like.

Next, a description will be given of the operation of the fourth embodiment.

In the fourth embodiment, as shown in FIG. 12, in the case where the rear seat cushion main body portion 12A is in the ordinary seating state, since the first top plate 54, the second top plate 56, and the third top plate 58 are deflected as the vehicle occupant 15 is seated, so that the seating comfort does not deteriorate.

In addition, when the vehicle occupant leaves the rear seat cushion main body portion 12A, the first top plate 54, the second top plate 56, and the third top plate 58 are raised by the restoring force of the rear seat cushion divisional portion 12B. Concurrently, the first top plate 54, the second top plate 56, and the third top plate 58 are able to return to their original positions by virtue of the restoring forces of the left- and right-hand pads 68 acting in the transverse direction. Further, since the transversely central portions 62C, 64C, and 66C of the first webbing 62, the second webbing 64, and the third webbing 66 are positioned with respect to the transversely central portions 54C, 56C, and 58C of the first top plate 54, the second top plate 56, and the third top plate 58 by sewing or the like, dislocation does not occur between the seat frame 60 and each of the first top plate 54, the second top plate 56, and the third top plate 58.

Figure 13:
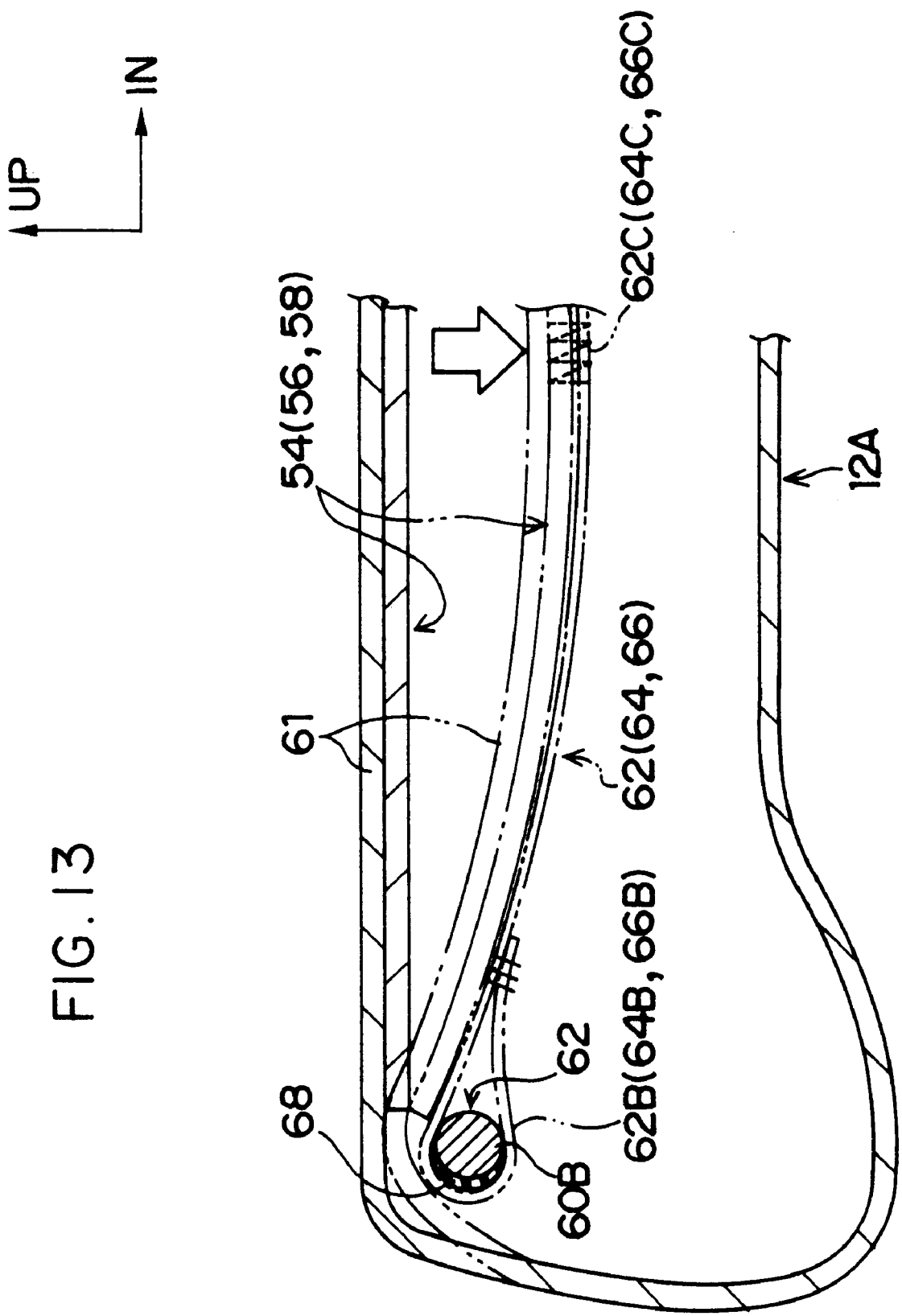
FIG. 13 is a cross-sectional view illustrating a right-hand half of the seat cushion, which is in the forwardly laid-down state, of the rear seat apparatus for a vehicle in accordance with the fourth embodiment of the present invention.

In addition, in the case where the rear seat cushion main body portion 12A is rotated approximately 180 degrees in the forward direction of the vehicle, as shown in FIG. 13, and is set in the forwardly laid-down state, when a load is applied to the first top plate 54, the second top plate 56, and the third top plate 58, the first webbing 62, the second webbing 64, and the third webbing 66 prevent the first top plate 54, the second top plate 56, and the third top plate 58 from sagging to the inner side of the seat frame 60. Meanwhile, when the load is removed, the first top plate 54, the second top plate 56, and the third top plate 58 are capable of returning to their original positions by virtue of the restoring forces of the left- and right-hand pads 68 acting in the transverse direction.

Figure 14:
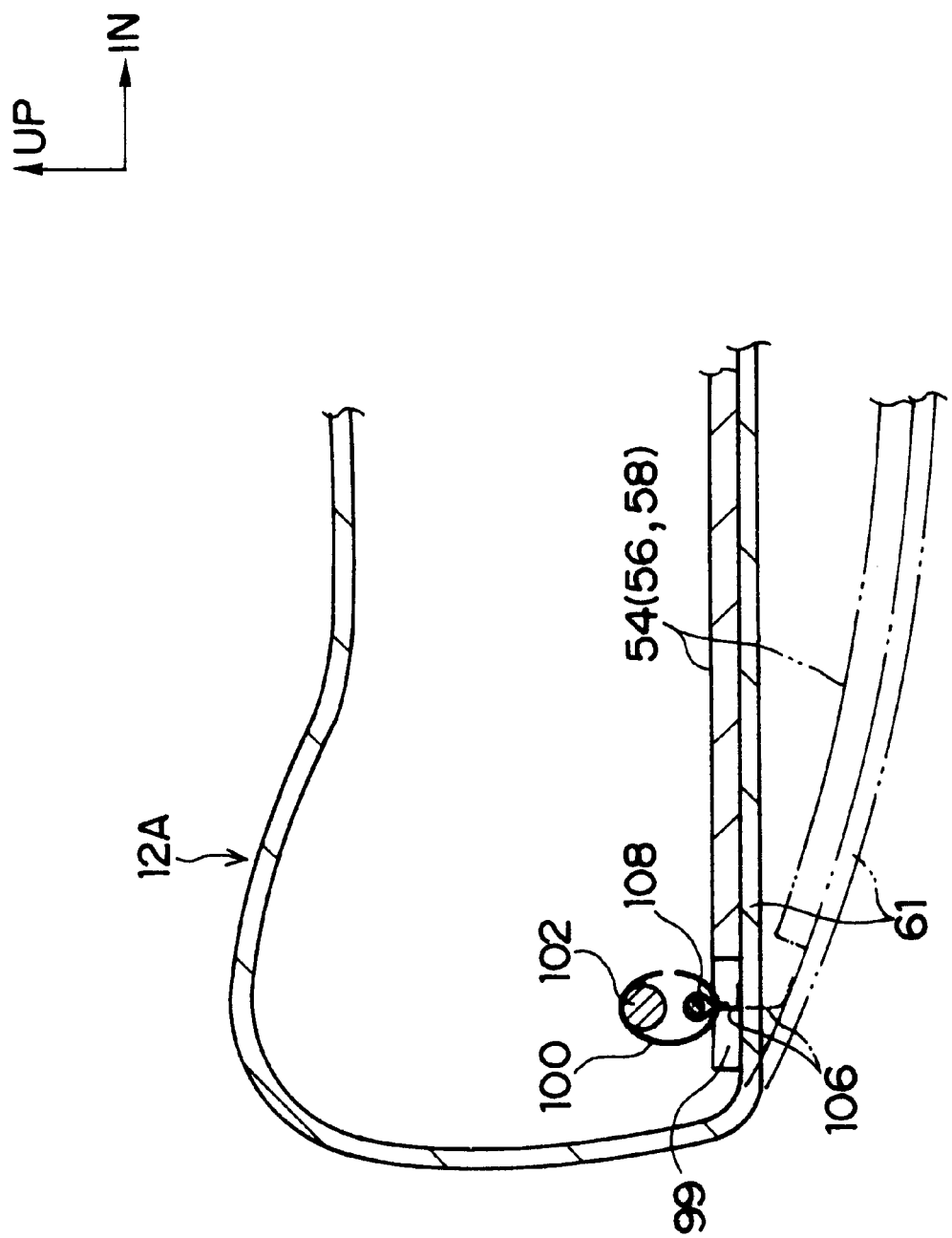
FIG. 14 is a cross-sectional view illustrating a right-hand portion of the seat cushion, which is in the ordinary seating state, of the rear seat apparatus for a vehicle in accordance with a modification of the embodiments of the present invention.
Figure 15:
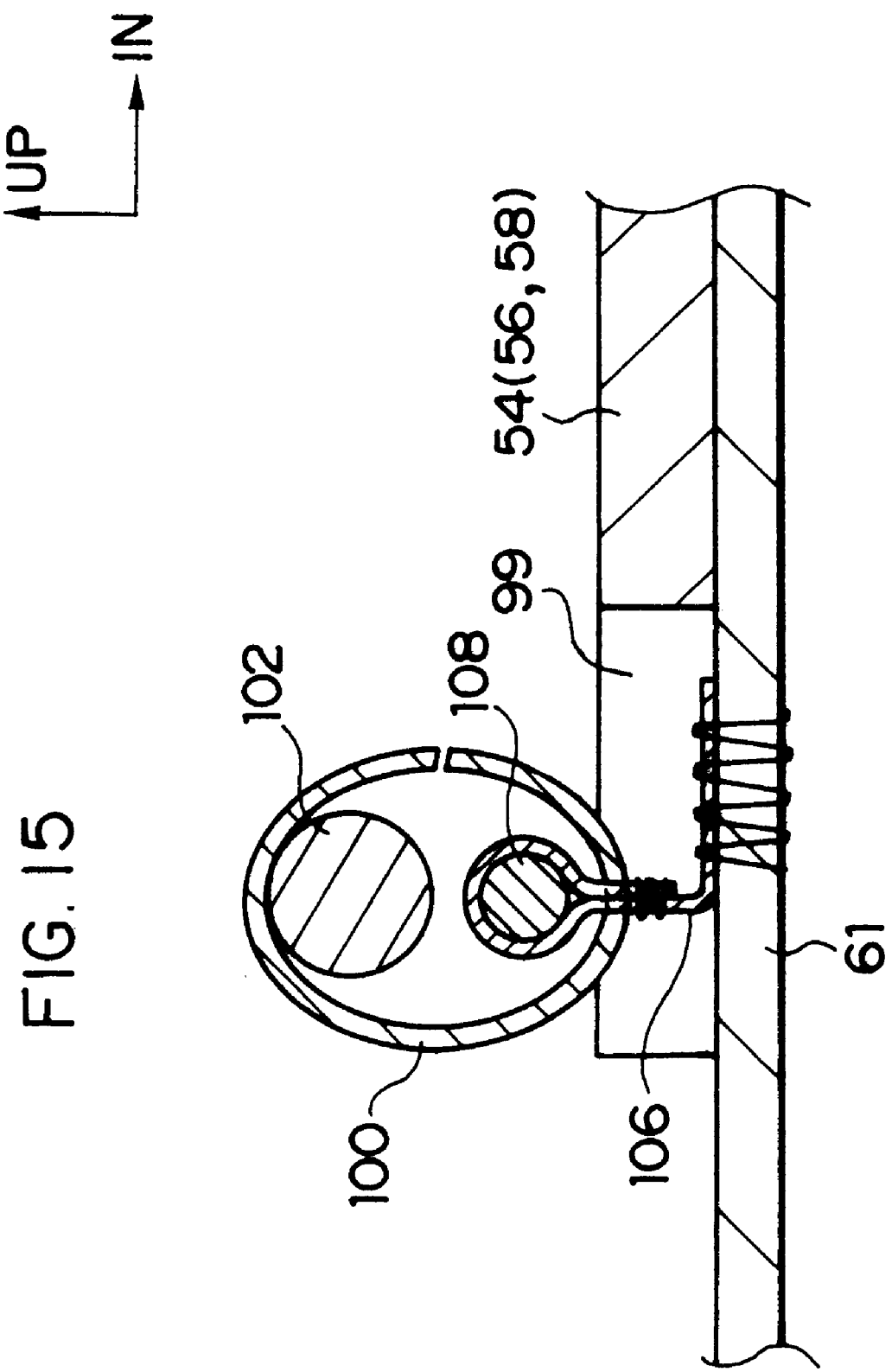
FIG. 15 is a partially enlarged view of FIG. 14.

As a mechanism for restoring the first top plate 54, the second top plate 56, and the third top plate 58 to their original positions, an arrangement may be provided as shown in FIGS. 14 and 15. Namely, instead of the pads 68, a notch 99 is formed in each of the first top plate 54, the second top plate 56, and the third top plate 58, a seat frame 102 on the seat pad side and a frame 108 on the seat surface layer side, which is connected to the seat surface layer 61 by a stretchable connecting member 106 such as a cloth, are coupled to each other by means of a coupling member 100 such as a hog ring. This arrangement is provided to impart restoring forces to the first top plate 54, the second top plate 56, and the third top plate 58 through the elasticity of the coupling members 106.

Figure 16:
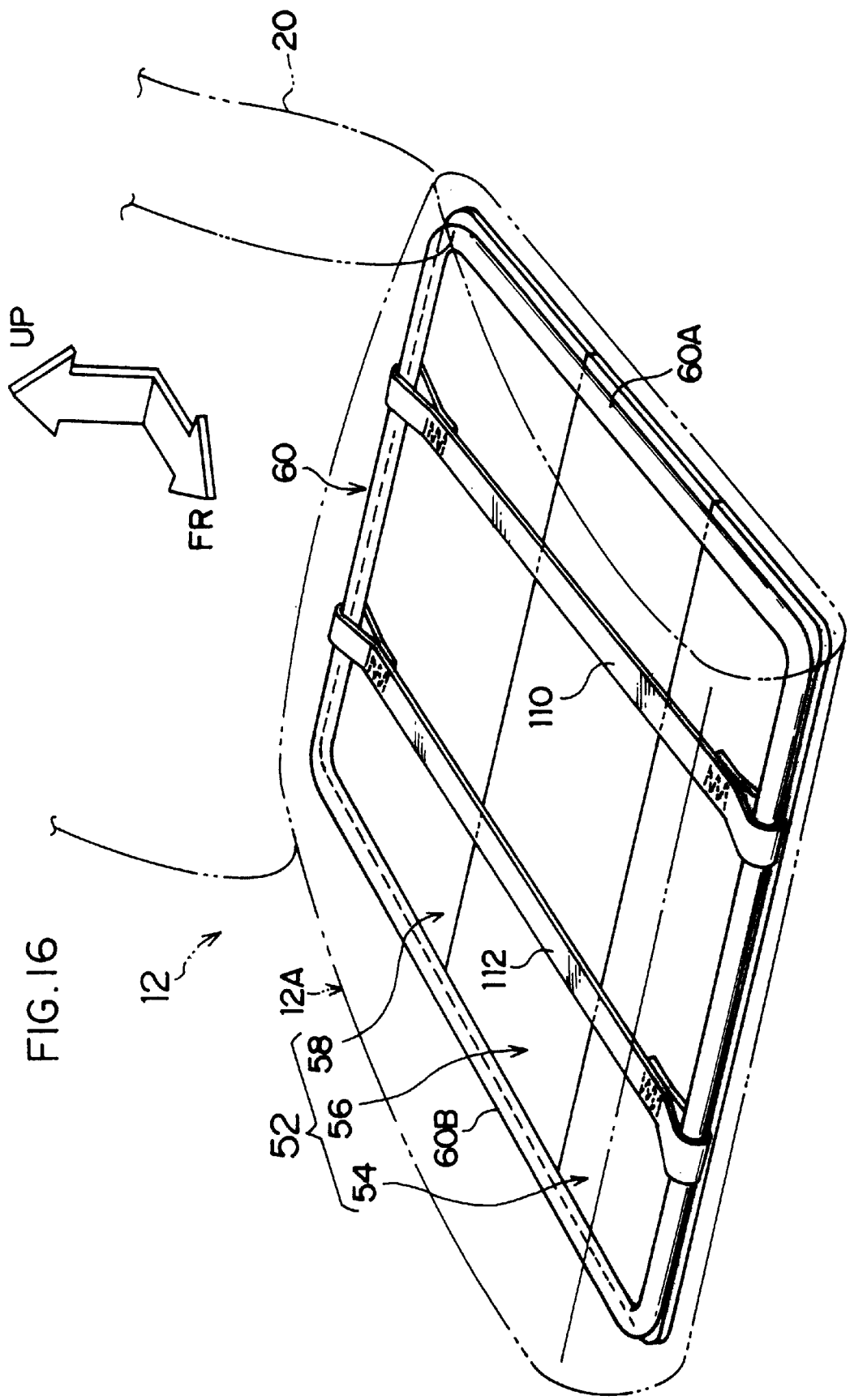
FIG. 16 is a perspective view, taken from the diagonally forward direction of the vehicle, of the seat cushion of the rear seat apparatus for a vehicle in accordance with a modification of the embodiments of the present invention.
Figure 17:
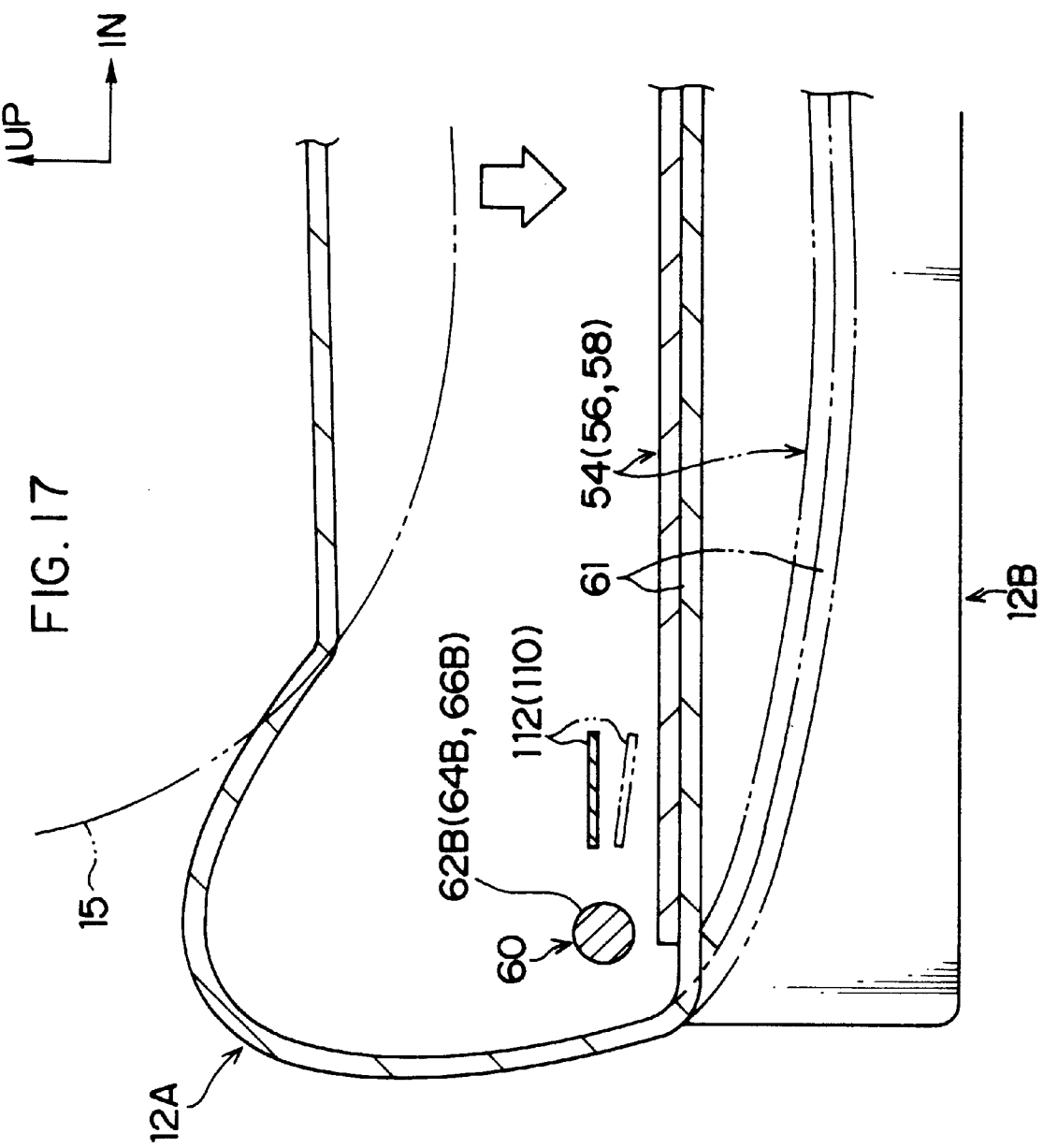
FIG. 17 is a cross-sectional view illustrating a right-hand half of the seat cushion, which is in the ordinary seating state, of the rear seat apparatus for a vehicle in accordance with the modification of the embodiments of the present invention shown in FIG. 16.
Figure 18:
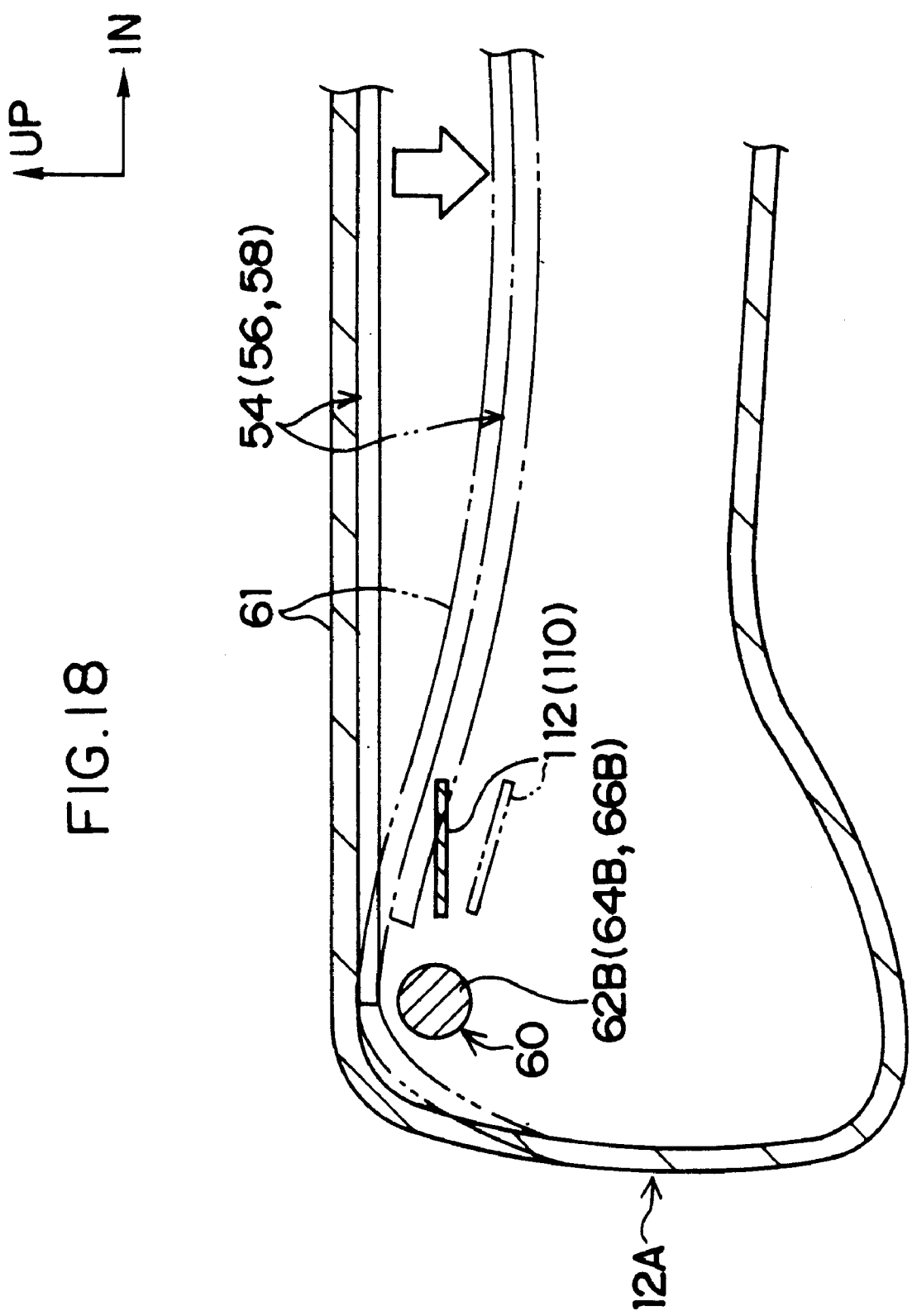
FIG. 18 is a cross-sectional view illustrating a right-hand half of the seat cushion, which is in the forwardly laid-down state, of the rear seat apparatus for a vehicle in accordance with the modification of the embodiments of the present invention shown in FIG. 16.
Figure 19:
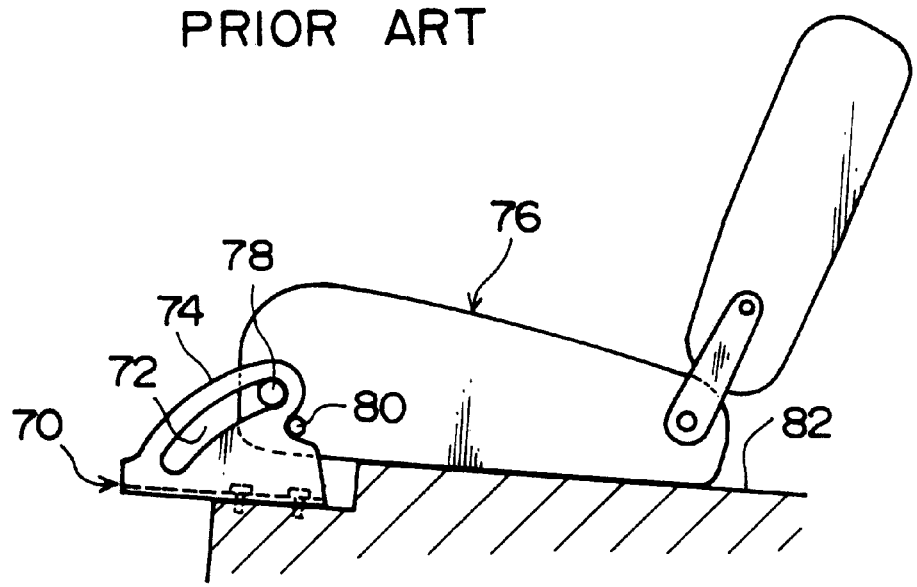
FIG. 19 is a schematic side elevational view illustrating the seating state of a conventional rear seat apparatus for a vehicle.
Figure 20:
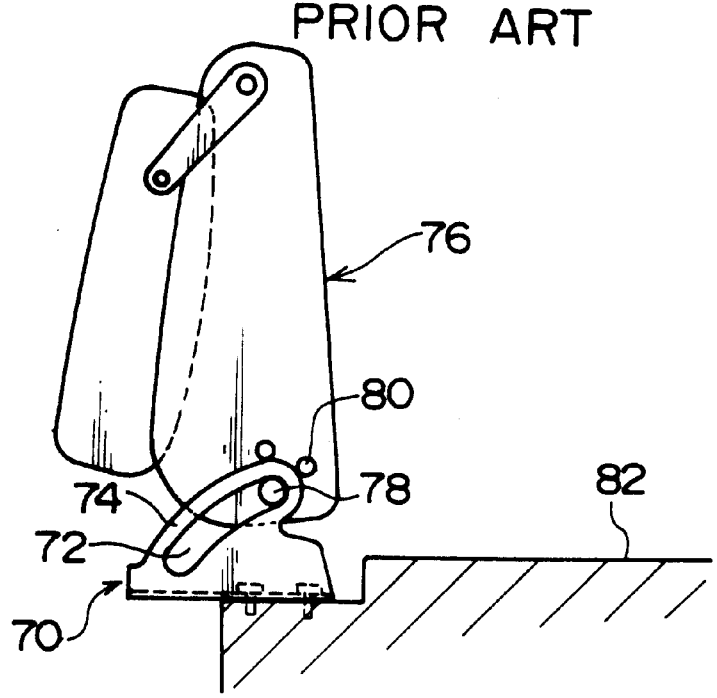
FIG. 20 is a schematic side elevational view illustrating an upright state of the conventional rear seat apparatus for a vehicle.

Further, as a mechanism for restoring the first top plate 54, the second top plate 56, and the third top plate 58 to their original positions, a pair of webbings 110 and 112 extending in the longitudinal direction of the vehicle may be stretched between longitudinal sides of the seat frame 60 in the vicinities of the left- and right-hand sides 60A and 60B thereof, as shown in FIG. 16. In this case, it suffices to use only two webbings 110 and 112, and since a webbing is not provided in the transversely central portions as shown in FIG. 17, it is difficult for the webbings 110 and 112 to restrict the deflection of the rear seat cushion main body portion 12A when the vehicle occupant 15 is seated. Meanwhile, in the case where the rear seat cushion main body portion 12A is set in the forwardly laid-down state as shown in FIG. 18, when a load is applied to the first top plate 54, the second top plate 56, and the third top plate 58, the webbings 110 and 112 prevent the first top plate 54, the second top plate 56, and the third top plate 58 from sagging to the inner side of the seat frame 60. Incidentally, as for the restoration of the first top plate 54, the second top plate 56, and the third top plate 58 in the transverse direction, the arrangement using the coupling member 100 such as a hog ring may be used, as shown in FIGS. 14 and 15.

While a detailed description has been given of specific embodiments of the present invention, the present invention is not limited to such embodiments, and it will be apparent to those skilled in the art that various changes and modifications may be made without departing from the spirit and scope of the invention.

What is claimed is:

1. A rear seat apparatus for a vehicle which is provided on a floor surface where a recess is formed, comprising:

a lower seat cushion portion located in the recess;

an upper seat cushion portion disposed above and separable from said lower seat cushion portion and having a seating surface, said upper seat cushion portion substantially covering said lower seat cushion portion so that an occupant seated on said seating surface is supported by both said upper seat cushion portion and said lower seat cushion portion;

a pivoting mounting mechanism for mounting said upper seat cushion portion to the floor surface and constructed and arranged to permit said upper seat cushion portion to pivot with respect to the floor and said lower seat cushion in a forward direction with respect to the vehicle about an axis extending transversely of the vehicle and located proximate a forward portion of the upper seat cushion portion, so that with said upper seat cushion portion in a forward rotated position, the recess is at least partially filled by said lower seat cushion portion;

a seat frame embedded in a peripheral portion of said upper seat cushion portion and defining a lower area of said upper seat cushion portion bounded by said seat frame; and a top plate portion provided below said seat frame when said upper seat cushion portion is in the occupant-supporting position and disposed over substantially the entire lower area bounded by said seat frame without being attached to said seat frame, said top plate portion being constructed and arranged to deflect downward in correspondence with body characteristics of an occupant seated on said upper seat cushion portion when said upper seat cushion portion is in said occupant-supporting position and to contact said seat frame when said upper seat cushion portion is in said forwardly laid-down position to limit downward movement of said top plate portion when subjected to a vertical load while said upper seat cushion portion is in said forwardly laid-down position.

2. A rear seat apparatus for a vehicle according to claim 1, wherein said lower seat cushion portion is a bag with a fluid sealed therein.

3. A rear seat apparatus for a vehicle according to claim 1, further comprising:

a seat back having a board on a rear surface thereof, said seat back being constructed and arranged to be swingable in forward direction with respect to the vehicle to a laid down position, said board being disposed over and supported by said lower seat cushion portion when said seat back is in the laid down position and when said upper seat cushion portion is pivoted forward with respect to said lower seat cushion portion.

4. A rear seat apparatus for a vehicle according to claim 1, wherein said upper seat cushion has a webbing extending in a transverse direction of the vehicle, said webbing being stretched between portions of a frame embedded in a peripheral portion of said upper seat cushion portion, and a resilient member is disposed between each of the portions of said frame and said webbing.

5. A rear seat apparatus for a vehicle according to claim 1, wherein said top plate portion is divided into top plates along a transverse direction of the vehicle.

6. A rear seat apparatus for a vehicle according to claim 5, wherein said top plates are connected to a seat surface layer provided in such a manner as to cover surfaces of said top plates.

7. A rear seat apparatus for a vehicle according to claim 5, wherein each of said top plate has sagging preventing means for prevent each of the top plates from sagging to an inner side of said seat frame when a load is applied thereto in the forwardly laid-down position.

8. A rear seat apparatus for a vehicle according to claim 7, wherein said sagging preventing means is provided on both sides of each of said top plates in the transverse direction of the vehicle, and is a bent portion capable of abutting against said seat frame.

9. A rear seat apparatus for a vehicle according to claim 1, further comprising:

a webbing stretched between portions of said seat frame located above said top plate portion.

10. A rear seat apparatus for a vehicle according to claim 9, wherein said webbing is stretched between transversely opposite sides of said seat frame along a transverse direction thereof, a resilient member being disposed between said webbing and each of the transversely opposite sides of said seat frame, said top plate portion being connected to said webbing.

11. A rear seat apparatus for a vehicle according to claim 9, wherein said webbing is a pair of webbings, and said pair of webbings are stretched between vehicle longitudinal side portions of said seat frame in vicinities of transverse sides of said seat frame.

12. A rear seat apparatus for a vehicle according to claim 1, wherein said top plate portion is positioned with respect to a seat surface layer which covers a surface of said top plate portion, said seat surface layer being connected to said seat frame by means of a stretchable connecting member.

13. A rear seat apparatus for a vehicle disposed on a floor surface portion of the vehicle which is higher than a remaining portion of the vehicle floor surface, thereby defining a step, and which has a recess formed therein, said rear seat apparatus for a vehicle comprising:

a lower seat cushion portion which is disposed in the recess;

an upper seat cushion portion disposed above the lower seat cushion portion and separable from the lower seat cushion portion;

a mounting mechanism for mounting said upper seat cushion portion to the step of the floor surface and constructed and arranged to permit said upper seat cushion portion to rotate upwardly approximately 90 degrees with respect to the floor step and said lower seat cushion portion in a forward direction with respect to the vehicle about an axis extending transversely with respect to the vehicle, so that with the upper seat cushion portion rotated upwardly, the recess is at least partially filled by said lower seat cushion portion;

a seat frame embedded in a peripheral portion of said upper seat cushion portion and defining a lower area of said upper seat cushion portion bounded by said seat frame; and a top plate portion provided below said seat frame when said upper seat cushion portion is in the occupant-supporting position and disposed over substantially the entire lower area bounded by said seat frame without being attached to said seat frame, said top plate portion being constructed and arranged to deflect downward in correspondence with body characteristics of an occupant seated on said upper seat cushion portion when said upper seat cushion portion is in said occupant-supporting position and to contact said seat frame when said upper seat cushion portion is in said forwardly laid-down position to limit downward movement of said top plate portion when subjected to a vertical load while said upper seat cushion portion is in said forwardly laid-down position.

14. A rear seat apparatus for a vehicle according to claim 13, wherein said lower seat cushion portion is a bag with a fluid sealed therein.

15. A rear seat apparatus for a vehicle according to claim 13, further comprising:

a seat back having a board on a rear surface thereof, said seat back being constructed and arranged to be swingable in forward direction with respect to the vehicle to a laid down position, said board being disposed over and supported by said lower seat cushion portion when said seat back is in the laid down position and when said upper seat cushion portion is rotated upwardly.

16. A rear seat apparatus for a vehicle according to claim 13, wherein said upper seat cushion has a webbing extending in a transverse direction of the vehicle, said webbing being stretched between portions of a frame embedded in a peripheral portion of said upper seat cushion portion, and a resilient member is disposed between each of the portions of said frame and said webbing.

17. A rear seat apparatus for a vehicle according to claim 1, wherein said top plate portion is supported on said seat frame and constructed and arranged to hold a load applied to said top plate portion when said upper seat cushion portion is in said forwardly laid down position.

18. A rear seat apparatus for a vehicle according to claim 8, wherein said bent portion is formed so as to be able to engage with said seat frame when said upper seat cushion portion is in said occupant supporting position and the occupant is seated.

19. A rear seat apparatus for a vehicle according to claim 5, wherein said top plates are disposed substantially without gaps between said top plates.

20. A rear seat apparatus for a vehicle according to claim 5, wherein said top plate portion is divided into top plates so as to deflect downward in correspondence with body characteristics of the occupant when said upper seat cushion is in said occupant supporting position and the occupant is seated.

21. A rear seat apparatus for a vehicle according to claim 5, wherein at least one of said top plates is disposed above said lower seat cushion portion when said upper seat cushion is in said occupant supporting position.

22. A rear seat apparatus for a vehicle according to claim 20, wherein at least one of said top plates is disposed above said lower seat cushion portion so as to be able to rotate downward in correspondence with body characteristics of the occupant when said upper seat cushion is in said occupant supporting position and the occupant is seated.

* * * * *